United States Patent [19]
Gee et al.

[11] Patent Number: 5,537,549
[45] Date of Patent: Jul. 16, 1996

[54] COMMUNICATION NETWORK WITH TIME COORDINATED STATION ACTIVITY BY TIME SLOT AND PERIODIC INTERVAL NUMBER

[75] Inventors: David J. Gee; Mark A. Lucak; Jonathan R. Engdahl, all of Washtenaw County; Timothy Siorek, Jackson County, all of Mich.

[73] Assignee: Allen-Bradley Company, Inc., Milwaukee, Wis.

[21] Appl. No.: 54,323

[22] Filed: Apr. 28, 1993

[51] Int. Cl.⁶ .................. G06F 13/372; H04J 3/16
[52] U.S. Cl. ............... 395/200.06; 395/200.19; 395/865; 395/200.2; 370/95.3; 370/100.1; 364/DIG. 1; 364/242.5; 364/238; 364/DIG. 2; 364/919; 364/940.6; 364/942.03; 364/942.7; 364/945.9; 364/942.1
[58] Field of Search .............. 370/85.1, 92, 95.3, 370/100.1, 105.1; 395/200.06, 200.19, 865, 200.2, 730

[56] References Cited

U.S. PATENT DOCUMENTS

| | | | |
|---|---|---|---|
| 4,017,841 | 4/1977 | Jensen | 395/299 |
| 4,229,792 | 10/1980 | Jensen et al. | 395/299 |
| 4,241,444 | 12/1980 | Kister | 370/85 |
| 4,319,338 | 3/1982 | Grudowski et al. | 395/289 |
| 4,347,604 | 8/1982 | Saito et al. | 370/85 |
| 4,404,651 | 9/1983 | Grudowski | 395/839 |
| 4,413,319 | 11/1983 | Schultz et al. | 395/850 |
| 4,628,504 | 12/1986 | Brown | 370/85.1 |
| 4,663,704 | 5/1987 | Jones et al. | 364/188 |
| 4,667,323 | 5/1987 | Engdahl et al. | 370/85.4 |
| 4,718,061 | 1/1988 | Turner | 370/85.6 |
| 4,747,100 | 5/1988 | Roach et al. | 370/85.5 |
| 4,750,150 | 6/1988 | Weppler | 395/828 |
| 4,780,869 | 10/1988 | Engdahl et al. | 370/16 |
| 4,809,217 | 2/1989 | Floro et al. | 395/872 |
| 4,890,222 | 12/1989 | Kirk | 395/200 |
| 4,897,834 | 1/1990 | Peterson et al. | 370/85.1 |
| 4,918,652 | 4/1990 | Bennington et al. | 395/550 |
| 5,142,623 | 8/1992 | Staab et al. | 395/200.17 |
| 5,153,884 | 10/1992 | Lucak et al. | 371/32 |
| 5,392,421 | 2/1995 | Lennartsson | 395/550 |

FOREIGN PATENT DOCUMENTS 0132069  1/1985  European Pat. Off. .

Primary Examiner—Thomas C. Lee
Assistant Examiner—D. Dinh
Attorney, Agent, or Firm—Mark W. Pfeiffer; John M. Miller; John J. Horn

[57] ABSTRACT

Activity on a digital communication network is divided into periodic intervals and during a segment of each periodic interval a moderator station broadcasts a numerical count of the periodic intervals to all stations on the network. Each station has a memory in which a numerical value is stored, and a comparator that compares the numerical value to the numerical count received from the network. When the numerical count of the periodic intervals equals the numerical value, an apparatus within the station performs a defined operation, such as transmitting a message over the network or synchronizing a clock in the station to a master time standard. The equality of the periodic interval count and the numerical value also can be used to determine when to signal an external device. By using the count of the periodic intervals in this manner, the operation of several stations on the network can be coordinated.

10 Claims, 18 Drawing Sheets

COMMUNICATION NETWORK WITH TIME COORDINATED STATION ACTIVITY BY TIME SLOT AND PERIODIC INTERVAL NUMBER

BACKGROUND OF THE INVENTION

The present invention relates to digital communications networks, and more particularly, to temporal coordination of when data is exchanged over the network and when recipients execute commands sent over the network.

Factories are automated by controllers that are programmed, or configured, to operate specific machines or devices. These controllers may be general purpose, such as computers, numerical controls or programmable controllers; or they may be special purpose controllers, such as robot controllers, weld controllers or motor drives.

Each controller connects to the various sensing devices and operating devices on the machinery which it controls and it automates the operation of that machinery by inputting data from the sensing devices and outputting the appropriate data to the operating devices. This exchange of input and output ("I/O") data between the controller and the devices on the controlled machinery is often accomplished by direct connections between ports on the controller and each separate I/O device. However, when I/O devices are physically spread out over a large area, the wiring costs associated with such separate connections can become excessive.

One way to reduce wiring in such applications is to multiplex I/O data through a serial communications link. Such serial I/O links are commonly used to connect the centrally located controller to separate remote racks, or chassis, that are positioned adjacent to the I/O devices. Such "remote I/O systems" are disclosed, for example, in U.S. Pat. Nos. 4,404,651; 4,413,319; 4,809,217 and 4,750,150, where the controller carries out a continuous high speed scan of the I/O) data associated with each remote rack and that data is conveyed through the serial communications link. It can be appreciated that such serial I/O links must promptly and reliably convey the I/O data, since that data is directly controlling operating devices on a machine that is operating in real time.

While a single controller may automate a machine, or a small group of machines, such "islands of automation" must be connected together to truly automate an entire factory. These latter connections are provided by industrial local area networks that enable each controller to send messages to other similar controllers in the factory over serial data links. There are a large number of such "peer-to-peer" communications networks known in the art, some of which are developed by standards committees like IEEE 802.3, IEEE 802.4, IEEE 802.5 and MAP; and others are developed by manufacturers of the controller like those disclosed in U.S. Pat. Nos. 4,319,338; 4,667,323 and 4,747,100. It can be appreciated that the nature of the peer-to-peer data conveyed on local area networks connecting controllers is different than I/O data conveyed on serial I/O links.

A recent trend in industrial control is the increasing use of smaller controllers in so-called "distributed processing." For example, rather than a single large controller linked to a set of remote I/O racks, an alternative architecture is a set of linked small controllers positioned about the factory in place of each remote I/O rack. In a distributed system it may be necessary to coordinate the exchange of data so that a group of these smaller controllers that are associated with a section of the factory will act on data at the same time. It may also be important that data from sensors connected to different controllers be sent over the network at about the same time to provide a "snap shot" of the entire manufacturing process at a given point in time.

Some of the data being exchanged may not be so time critical that it needs to be sent over the network every time that the station at which the data is generated gets access to the network. Rather, the data should be sent once a second, for example. Although the processor module in the controller can regulate the transmission of this data, that burden may adversely affect the processor's ability to control the factory machinery. Therefore, it is desirable to utilize a separate mechanism to provide this regulation.

In addition, each processor on the network has an internal clock. Although these clocks are driven by a crystal controlled oscillator, eventually their time will drift with respect to each other and to the real time. If several processors are to take action simultaneously based on the time of their clocks, the drift in time results in a non-simultaneous action. Therefore, it is desirable to provide a network communication mechanism by which the internal clocks of the processors can be synchronized periodically.

SUMMARY OF THE INVENTION

A digital communication network comprises stations connected to a transmission medium for the exchange of data among the stations. Activity on the network is divided into periodic intervals having known duration. During one segment of the periodic interval, a moderator station broadcasts network control information which defines how data is to be exchanged over the ., network. One item of this network control information is a count of the periodic intervals.

Another station on the network receives the network control information and stores the count of the periodic intervals. This latter station also has a register for storing a numerical value and a comparator which compares the count of the periodic intervals to the numerical value. When the count is equal to the numerical value, an apparatus is activated to perform a defined operation. In this manner, performance of the operation can be coordinated with the occurrence of a specific periodic interval. In one implementation of this concept, the numerical value can be sent to the station in a message that is transmitted over the network. Similar messages can be sent to several stations so that their independent operations can be performed in a coordinated manner.

Several applications of this invention are contemplated. The first is for the station to hold data for transmission over the network until the periodic interval count equals the numerical value, at which time the data is transmitted. In this case, the device that originates the data also provides the numerical value to the station. In another application, a data processing device provides the numerical value to the station and the station returns a signal to the data processing device when the periodic interval count reaches the numerical value. This provides a time coordination signal to the data processing device and the signal can be used as a trigger for a function which the device performs.

This invention also may be used to synchronize the clocks in the network stations. For this application one of the stations on the network is designated as having a master clock which acts as a time reference for all of the stations. Periodically the master clock station sends a message to the other stations which message contains a numerical value and a future time value. Each station responds to this message by comparing each periodic interval count to the numerical value from the message. When equality occurs, each station compares the time from its clock to the future time value sent over the network. If necessary, each station adjusts its clock in response to the comparison.

A general object of the present invention is to provide a mechanism by which actions by one or more stations on the communication network can be coordinated in time, as well as with respect to one another. This mechanism enables functions performed by separate stations on the network to be executed either simultaneously or in a defined temporal relationship to one another.

Another object is to provide time reference signal that is periodically transmitted to the stations on a communication network.

A further object of the present invention is to provide a media access controller which stores data from a host processor and then transmits that data over the network at a given time as indicated by the time reference signal.

Yet another object is to provide an apparatus by which separate clocks in the stations connected to the network can be synchronized. This is accomplished using the time reference signal.

BRIEF DESCRIPTION OF THE DRAWINGS

Communication System

Communication Controller

Figure 5A:
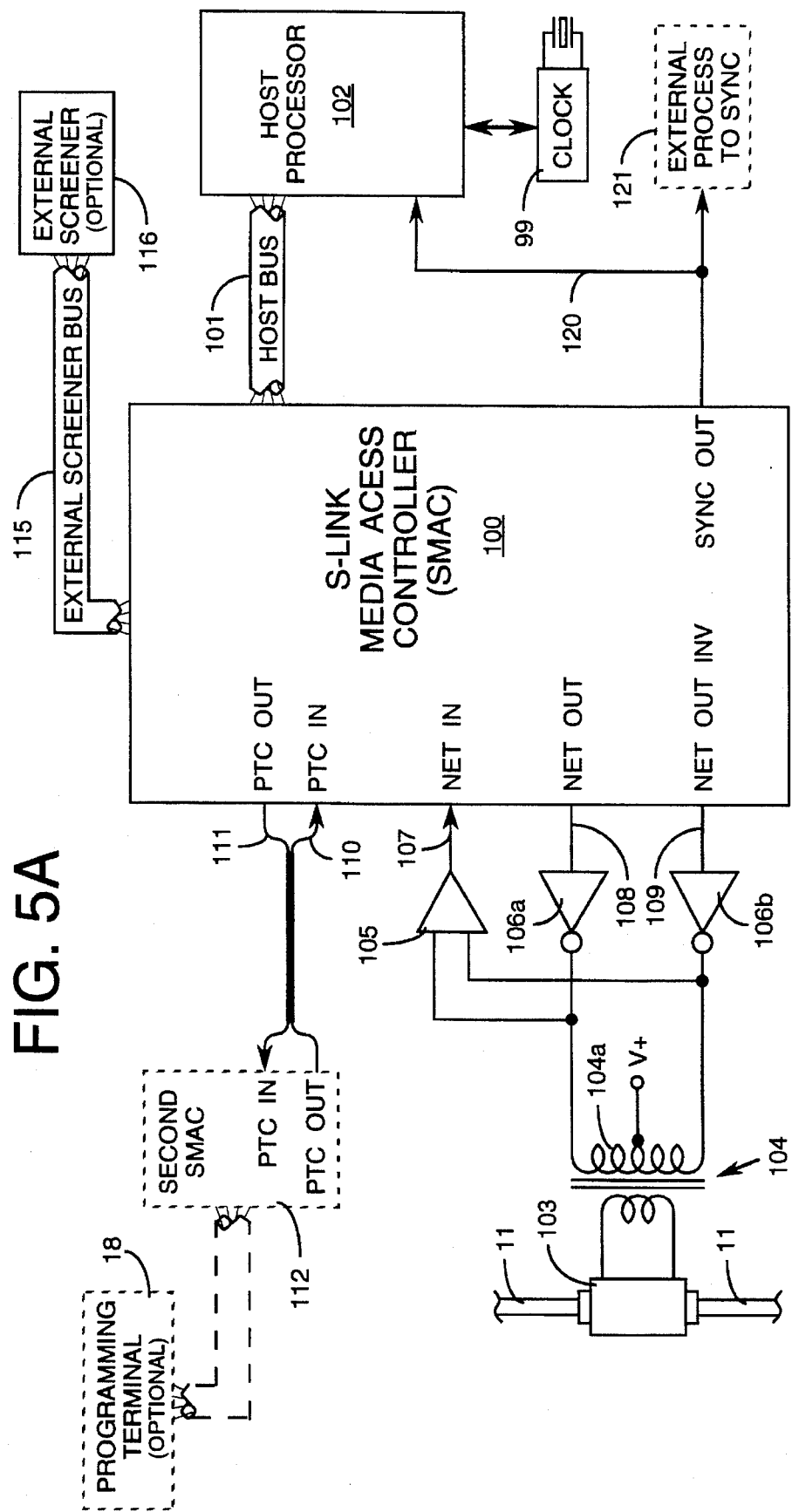
Figure 5B:
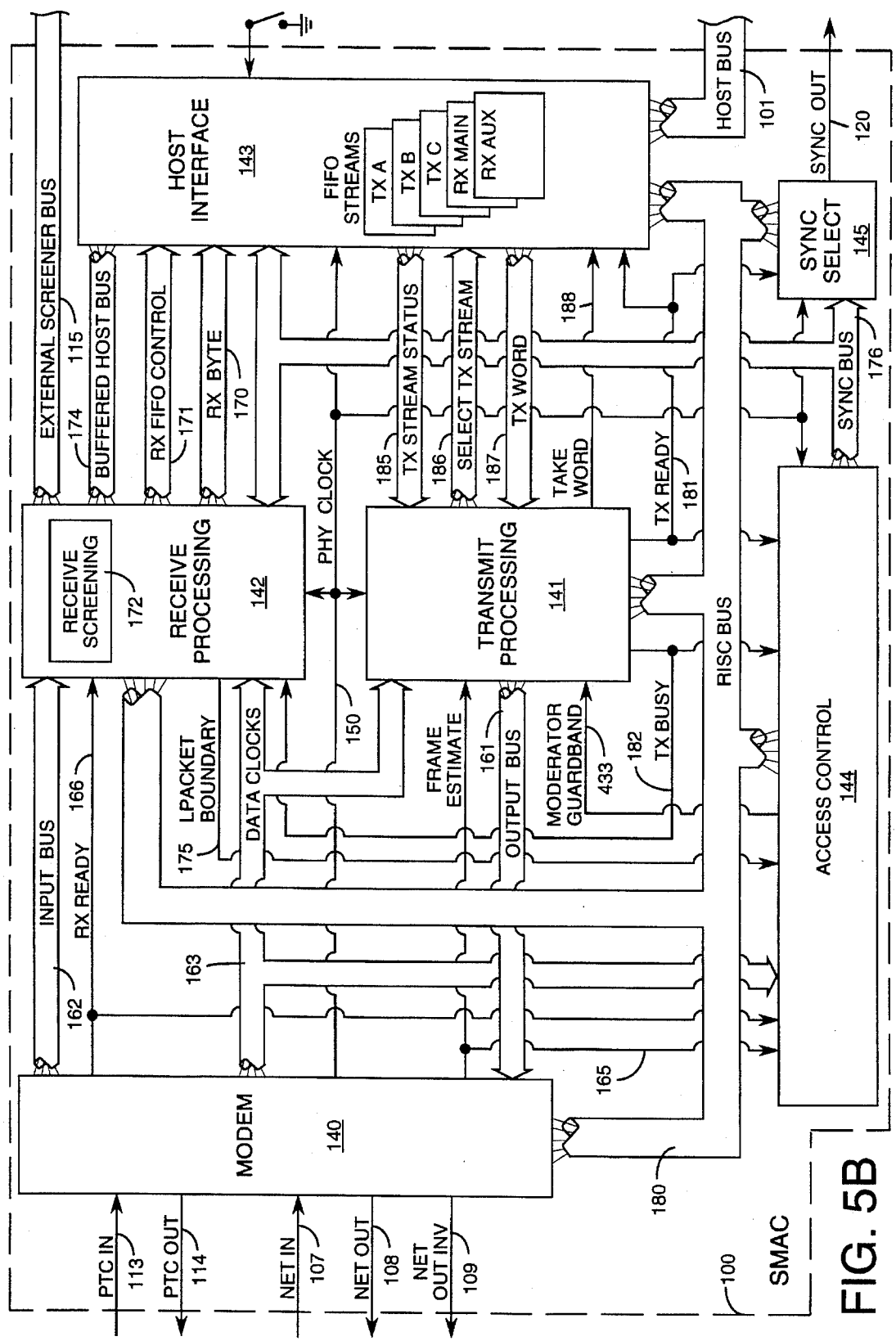
Figure 6:
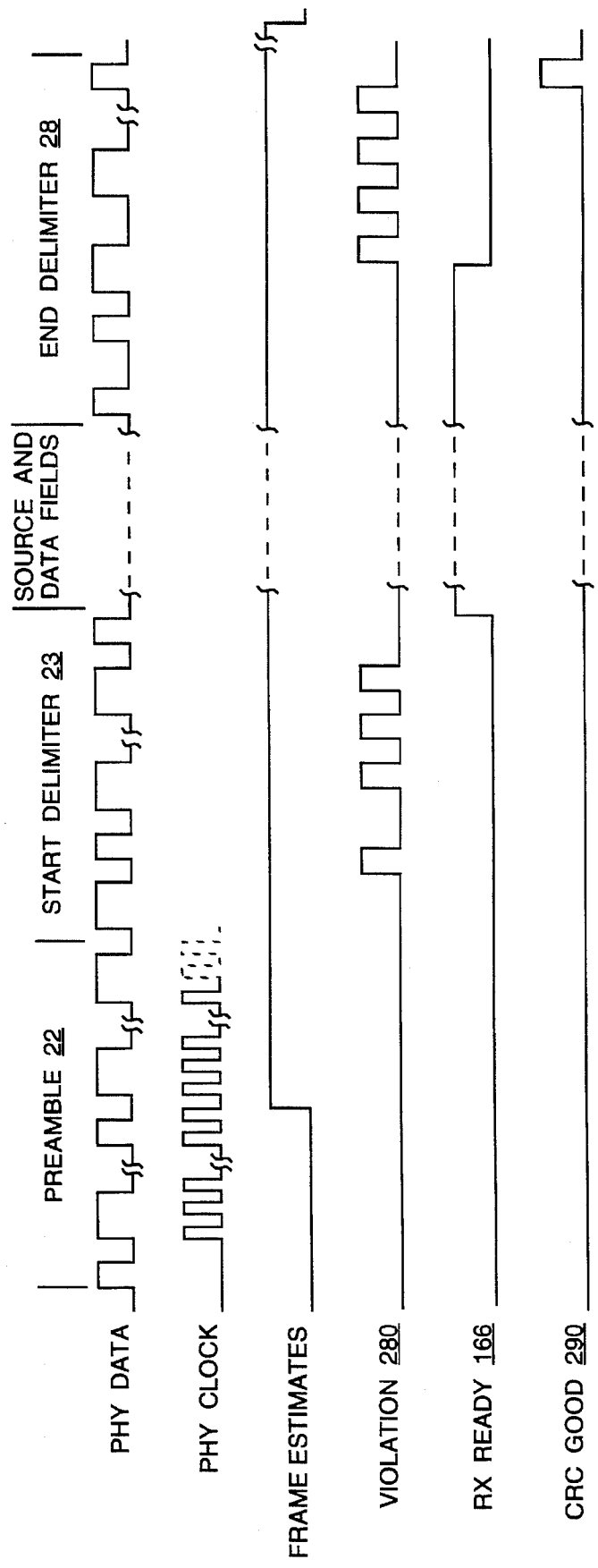

FIG. 5A shows how an exemplary station is connected to the network by an S-Link media access controller (SMAC);

FIG. 5B is a schematic block diagram representation of the S-Link media access controller in FIG. 5A; and FIG. 6 is a Waveform diagram of signals at several locations in the SMAC.

SMAC Modem

Figure 7:
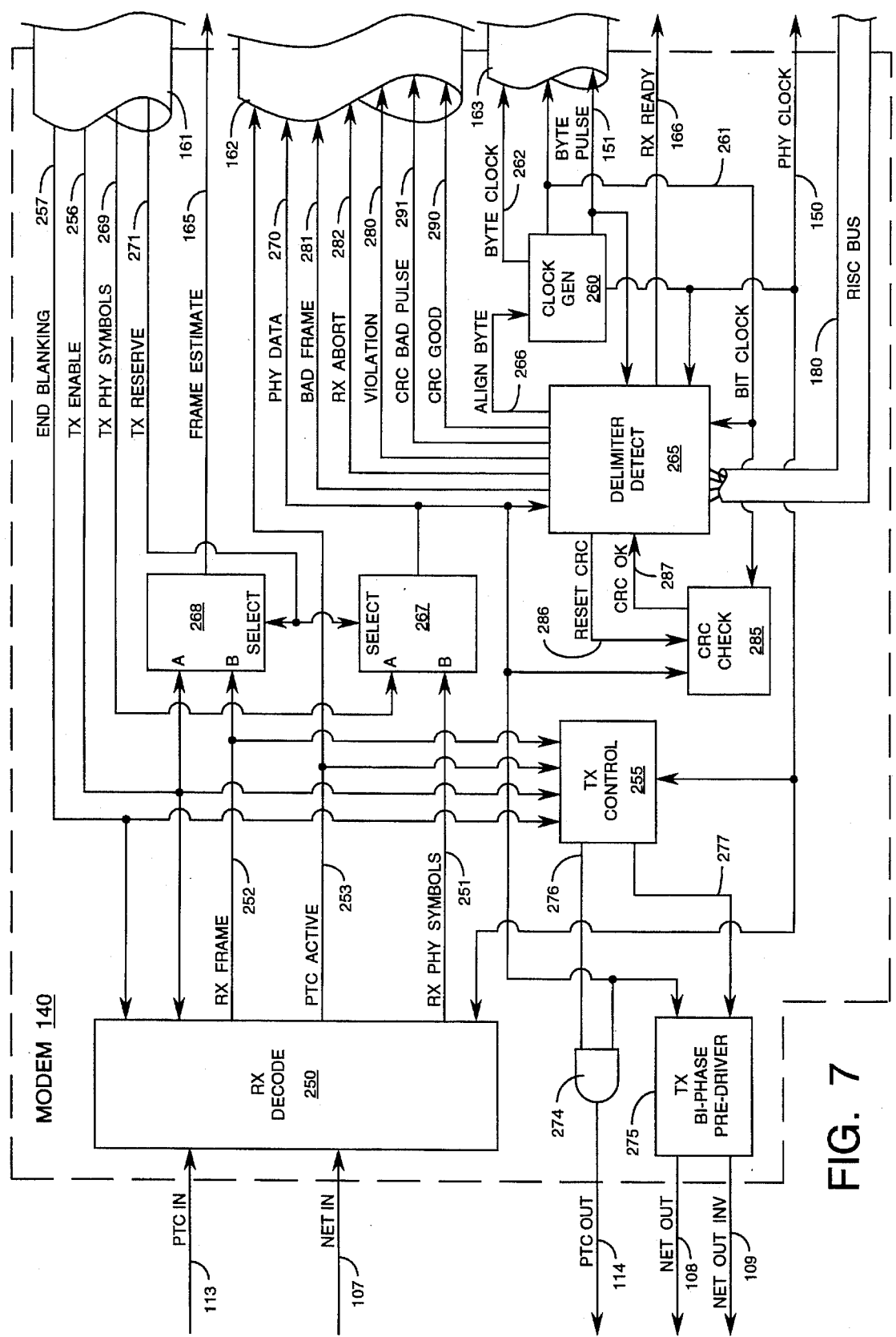
Figure 8:
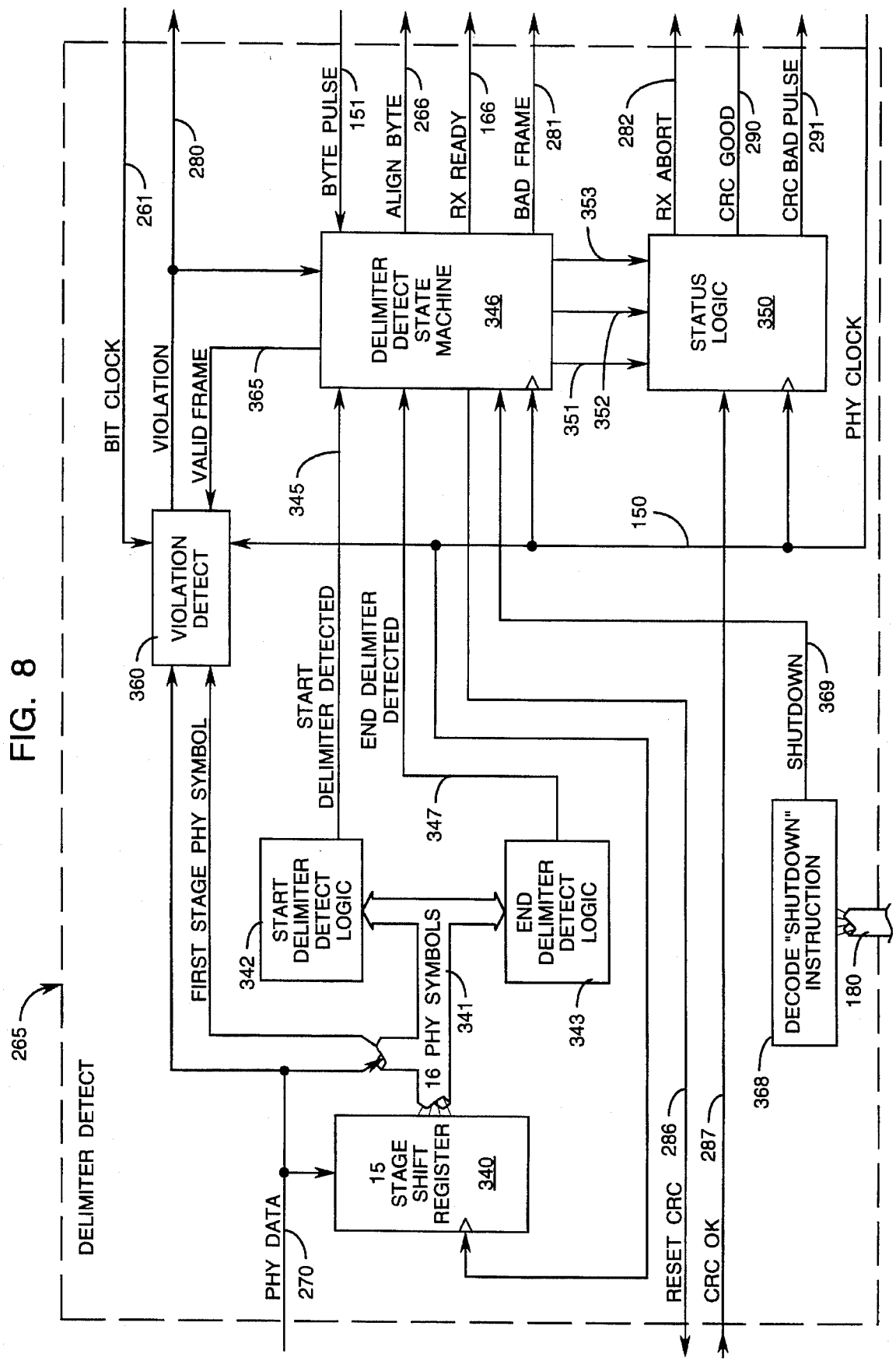
Figure 9:
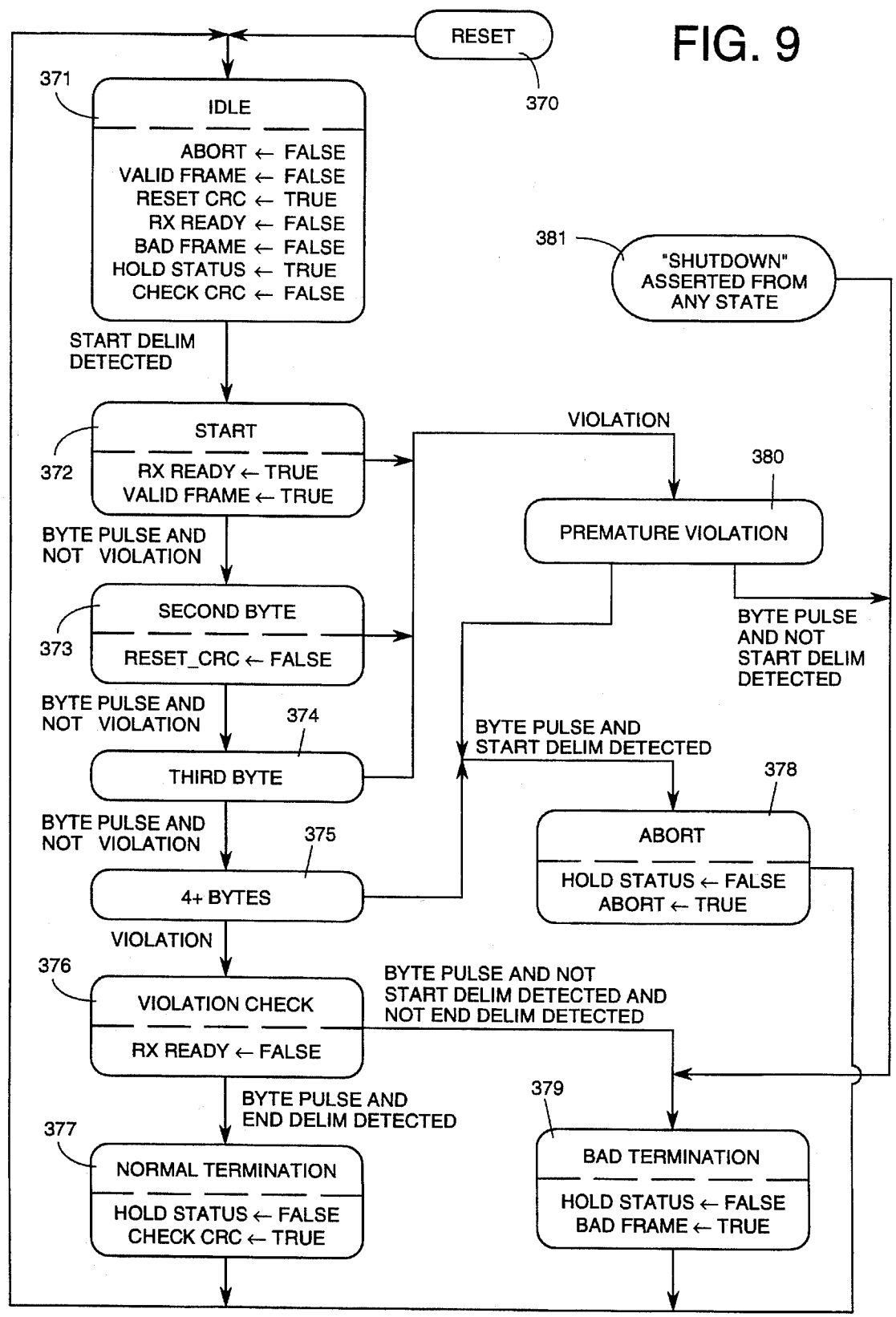

FIG. 7 is a schematic block diagram representation of the modem circuit in the SMAC;

FIG. 8 is a schematic block diagram representation of the delimiter detector in the modem; and FIG. 9 is a state machine diagram for the delimiter detector.

SMAC Access Control Circuit

Figure 10:
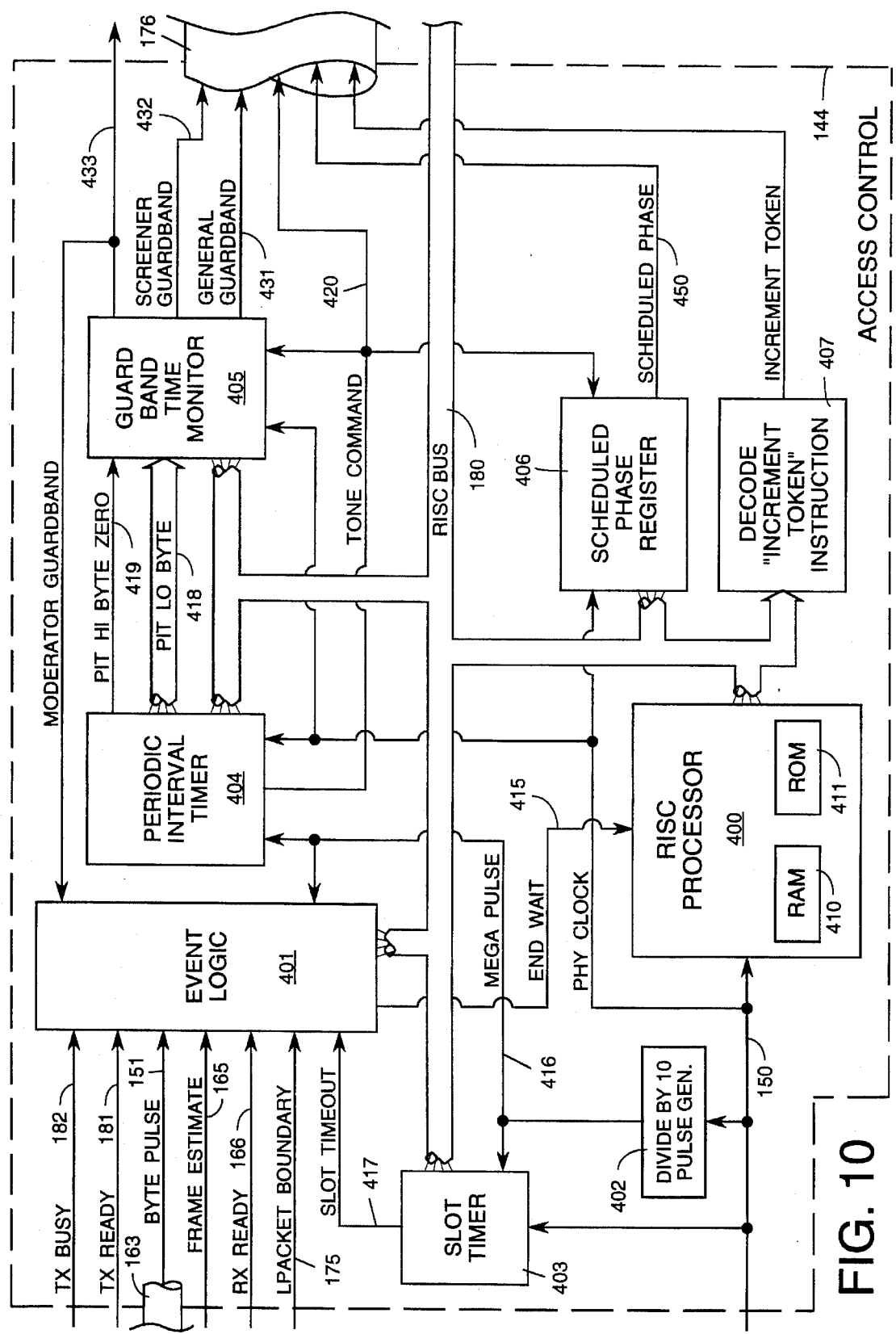
Figure 11:
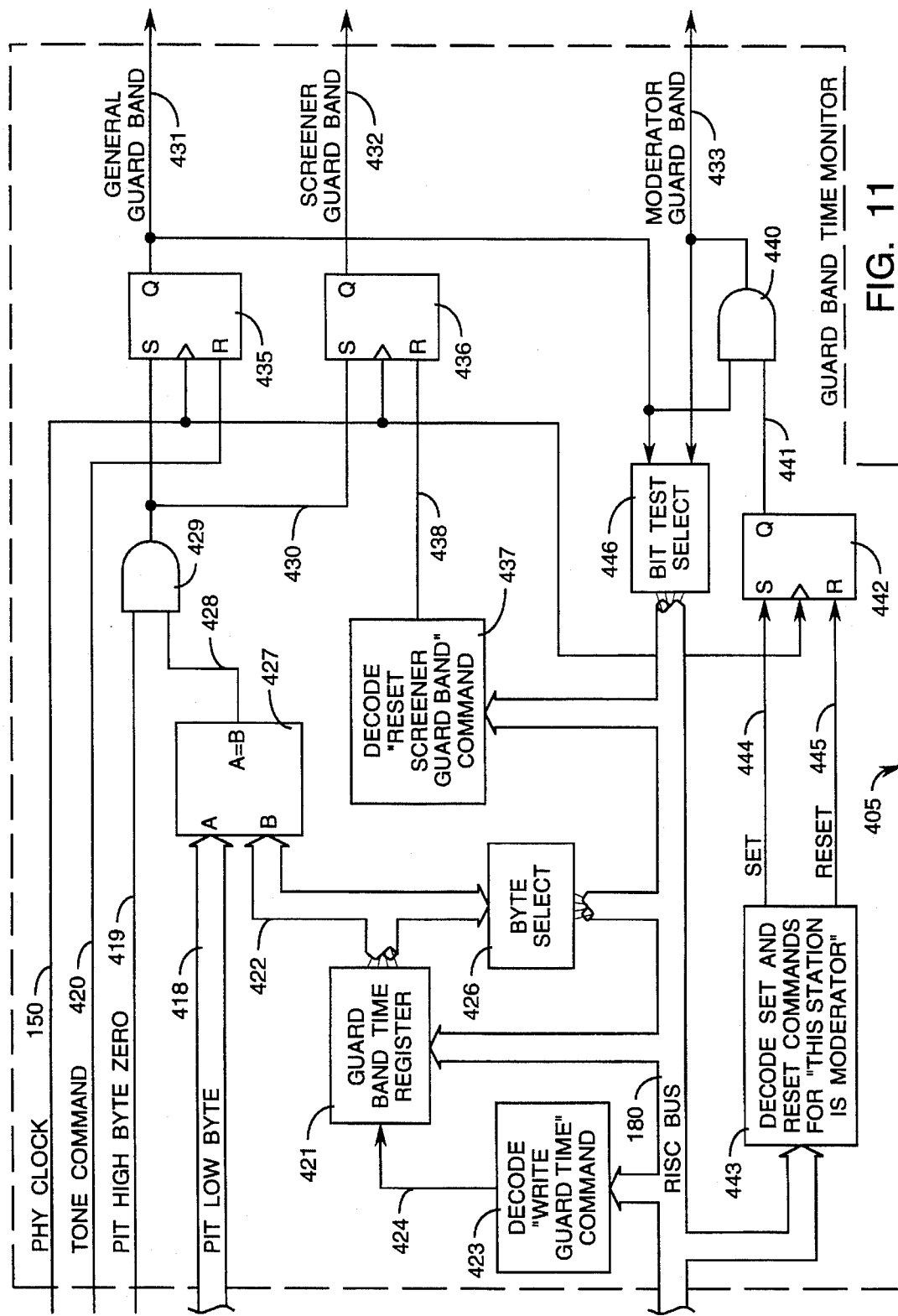
Figure 12:
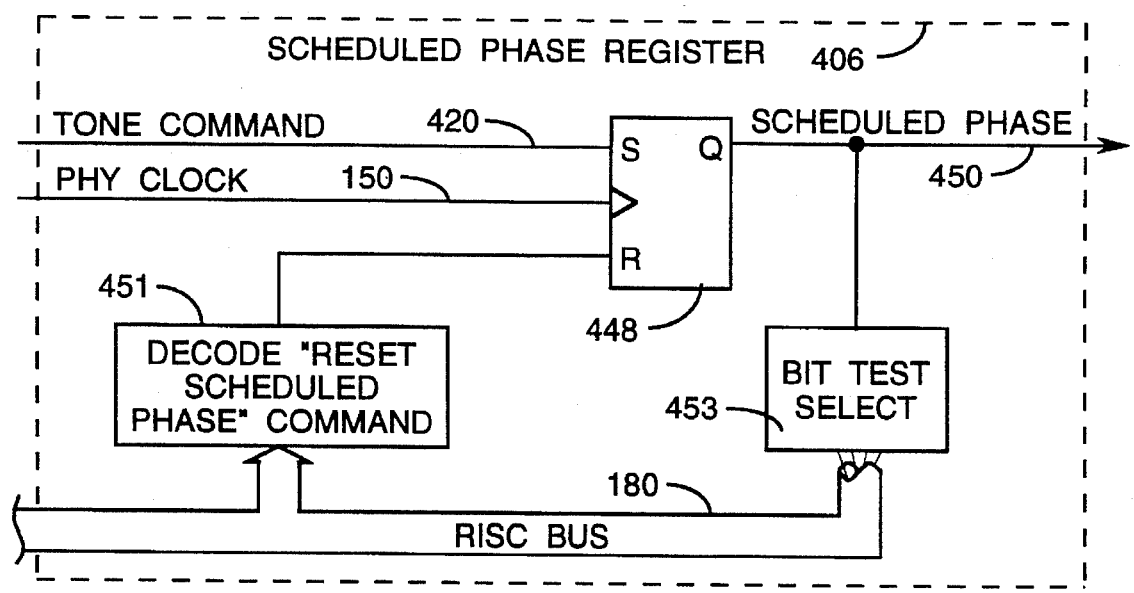
Figure 13:
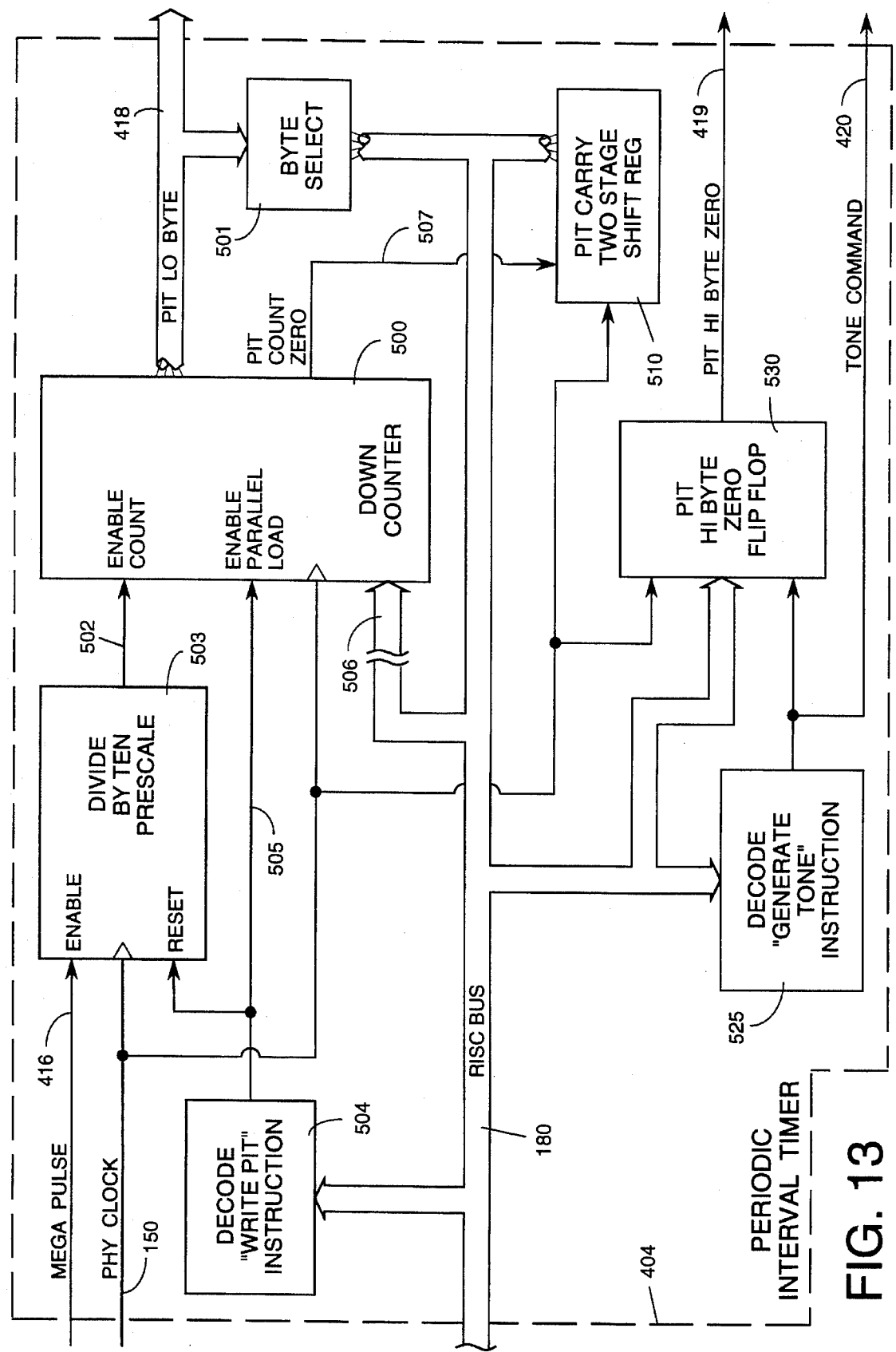

FIG. 10 is a schematic block diagram of the access control circuit in the SMAC;

FIG. 11 is a schematic representation of the guard time monitor in the access control circuit;

FIG. 12 is a schematic block diagram representation of the scheduled phase register in the access control circuit; and FIG. 13 is a schematic representation of the periodic interval timer in the access control circuit.

Transmit Receive Processors

Figure 14:
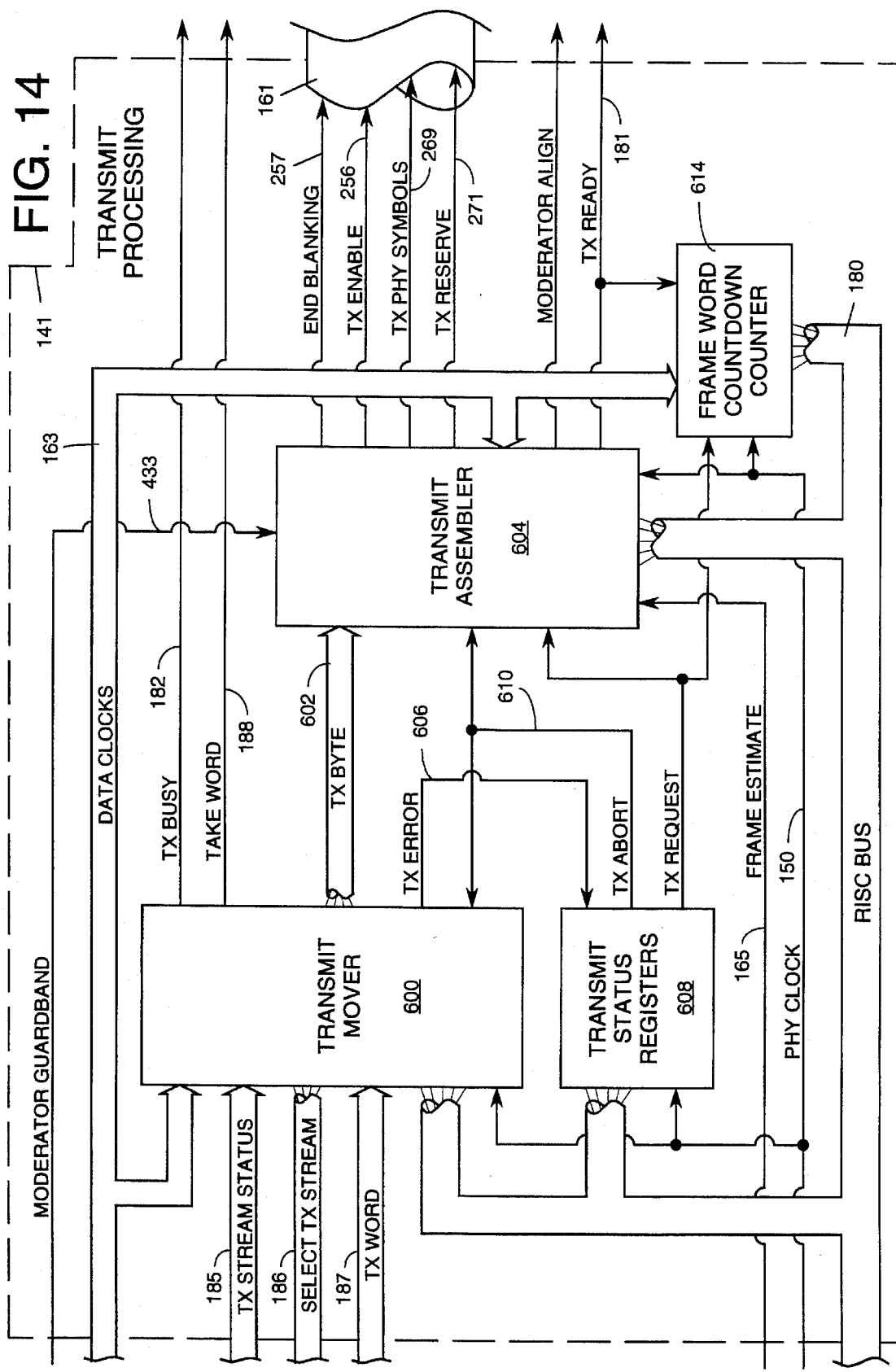
Figure 15:
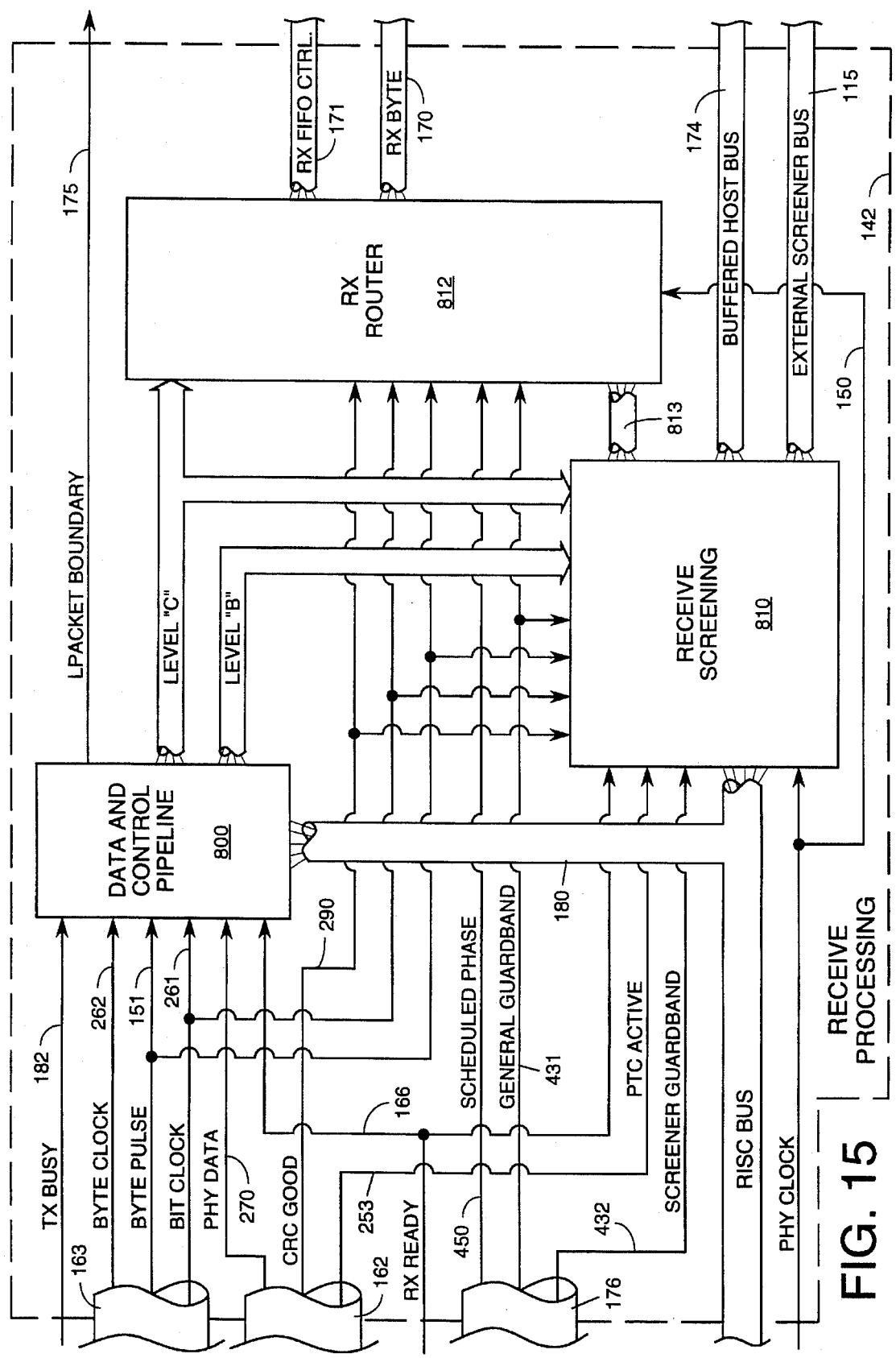
Figure 16:
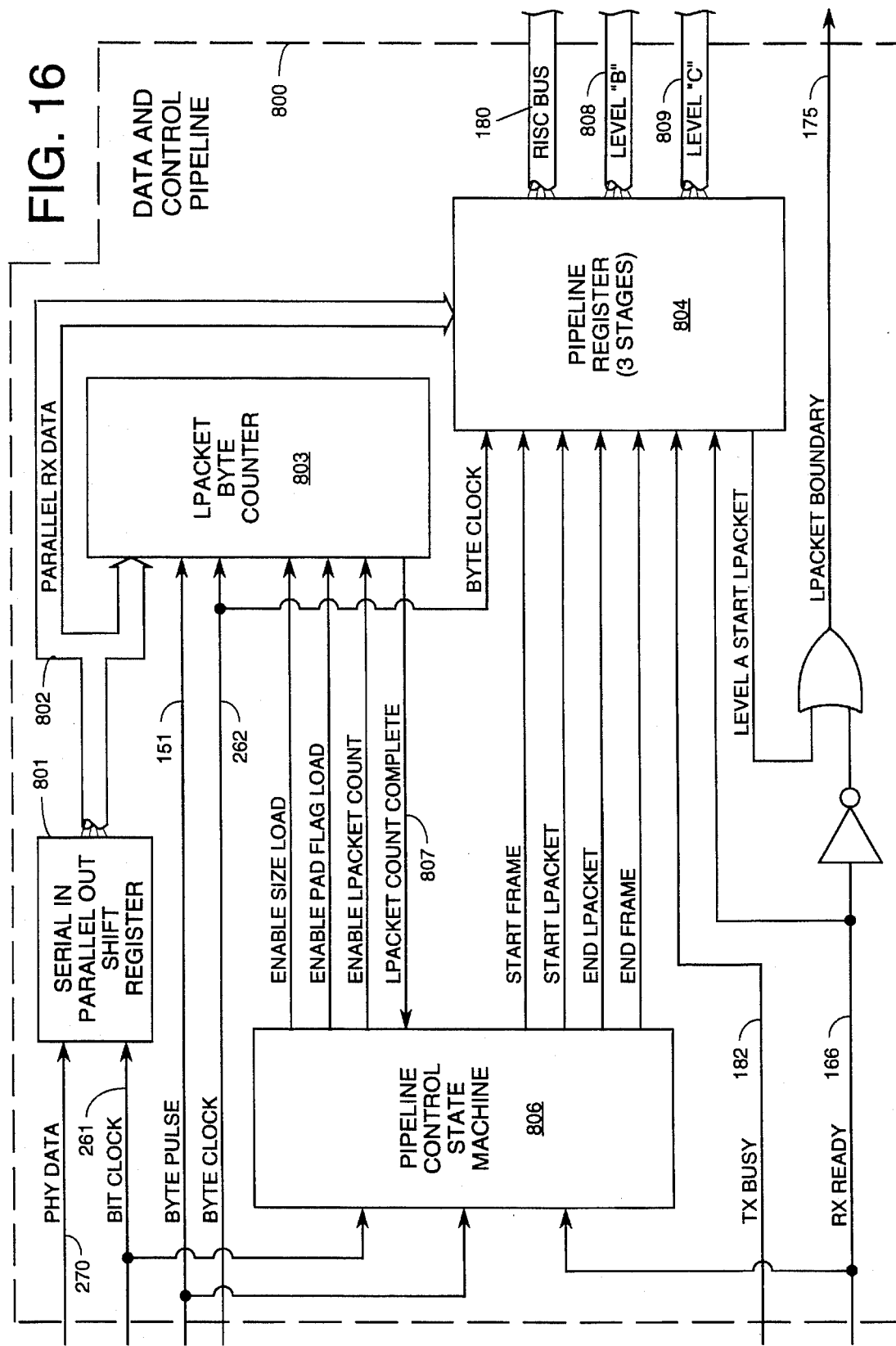

FIG. 14 is a schematic diagram representation of the transmit processing circuit in the SMAC;

FIG. 15 is a schematic block diagram representation of the receive processing circuit in the SMAC of FIG. 5B; and FIG. 16 is a schematic block diagram of the data and control pipeline in the receive processing circuit.

Host Interface

Figure 17:
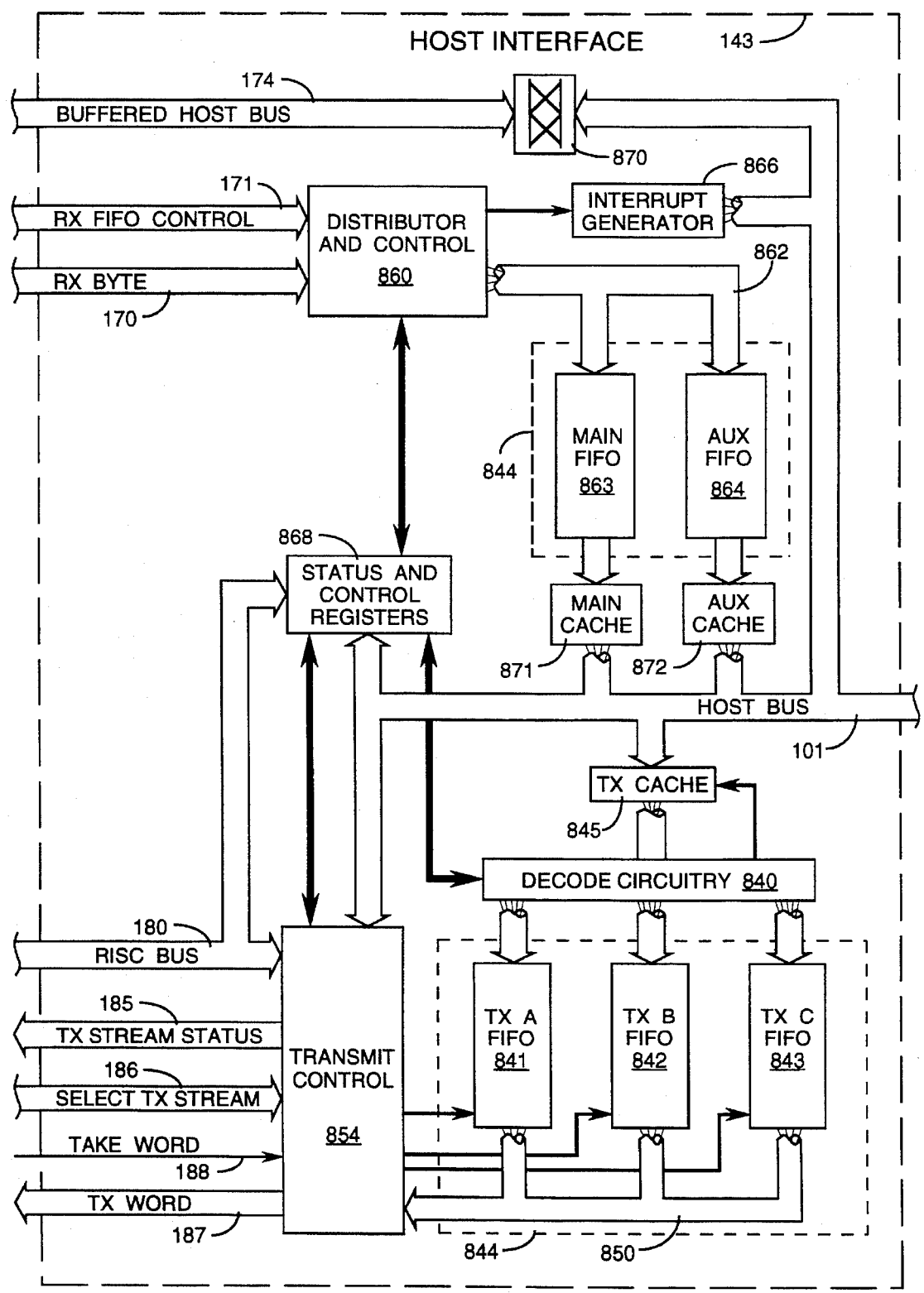

FIG. 17 is a block schematic diagram of the SMAC host interface.

Figure 18:
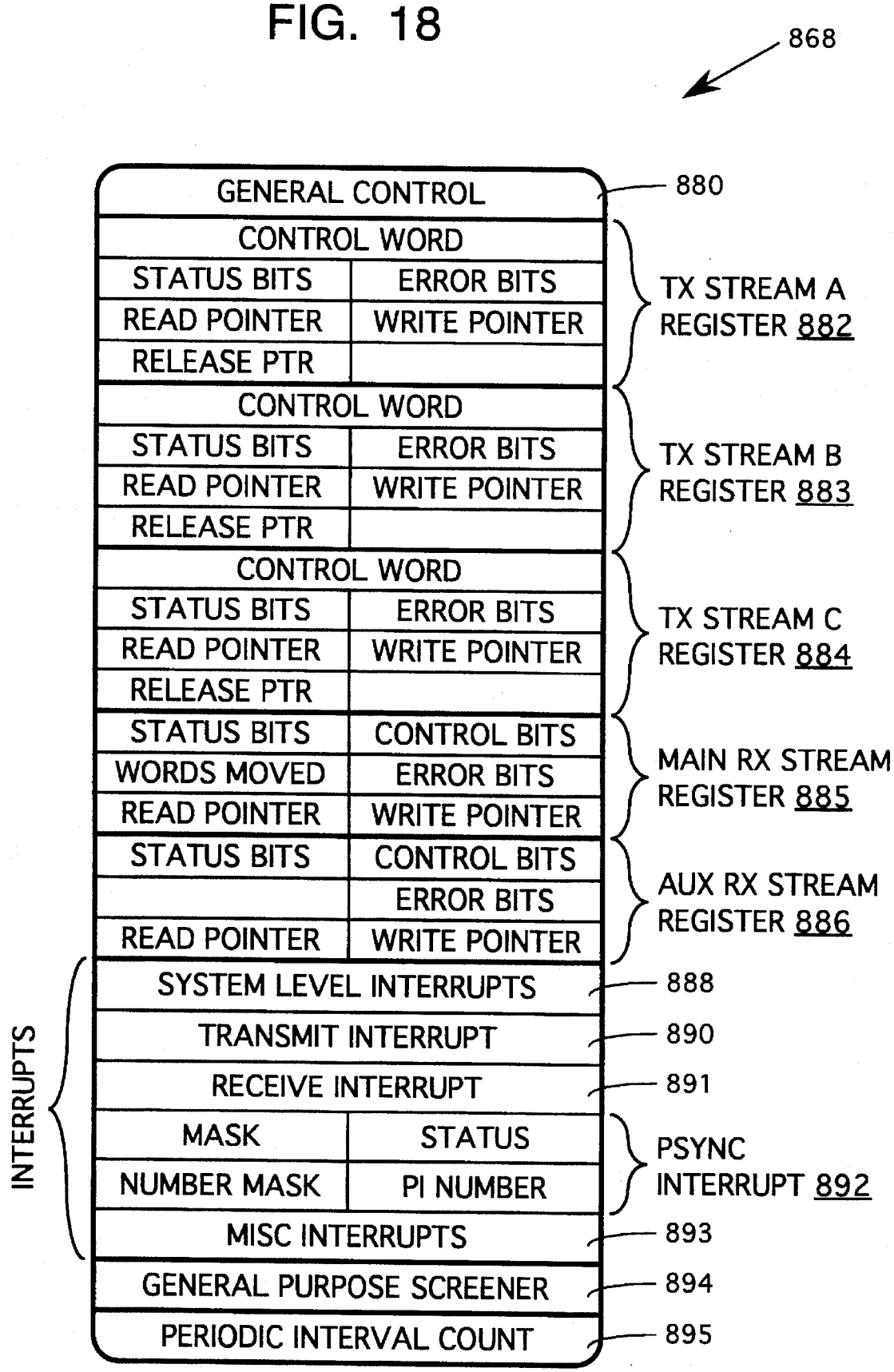

FIG. 18 depicts the organization of the status and control registers in the host interface.

Figure 19:
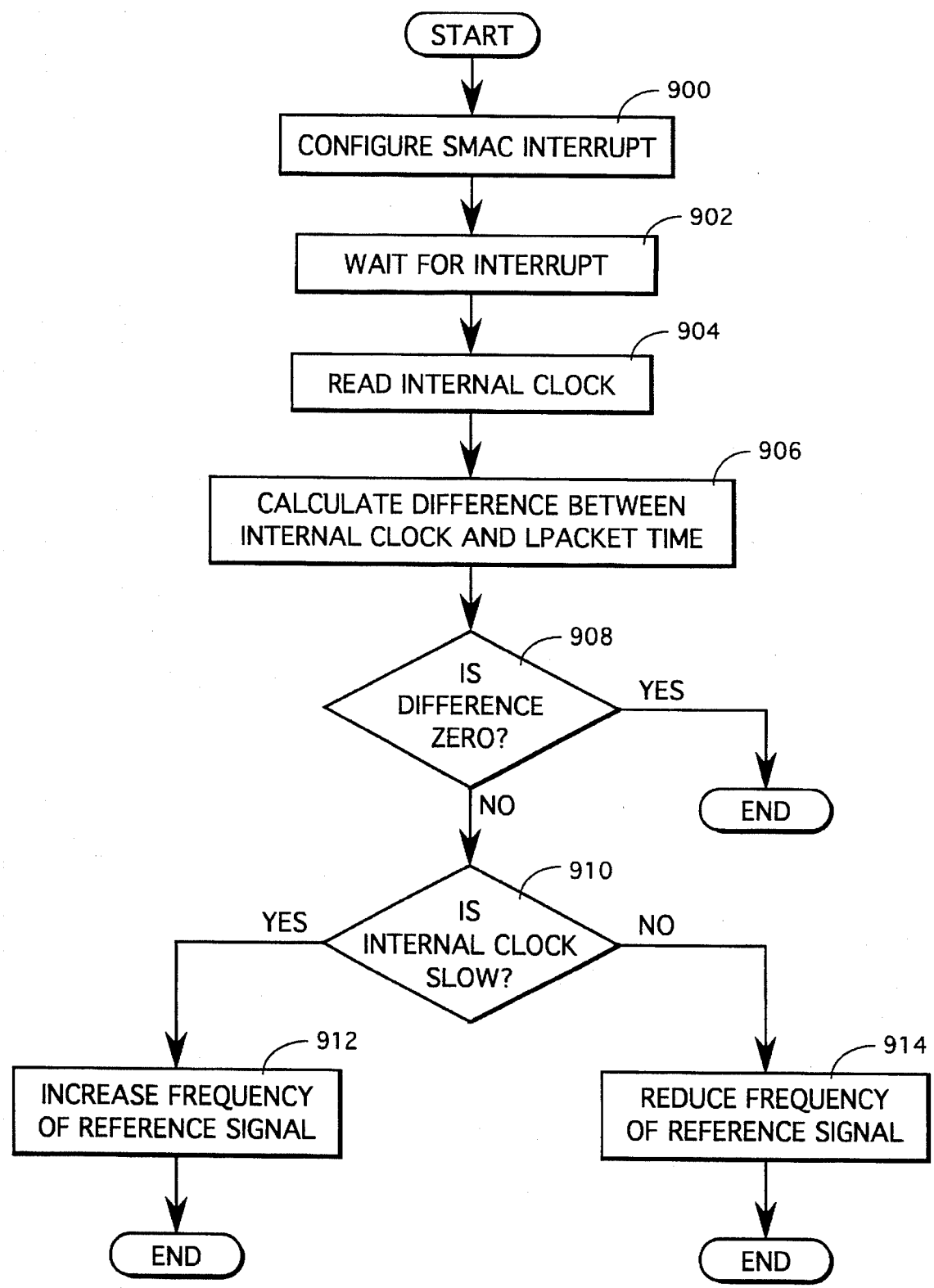

FIG. 19 is a flowchart of a program for synchronizing a clock in the host processor.

DESCRIPTION OF A PREFERRED EMBODIMENT

Figure 1:
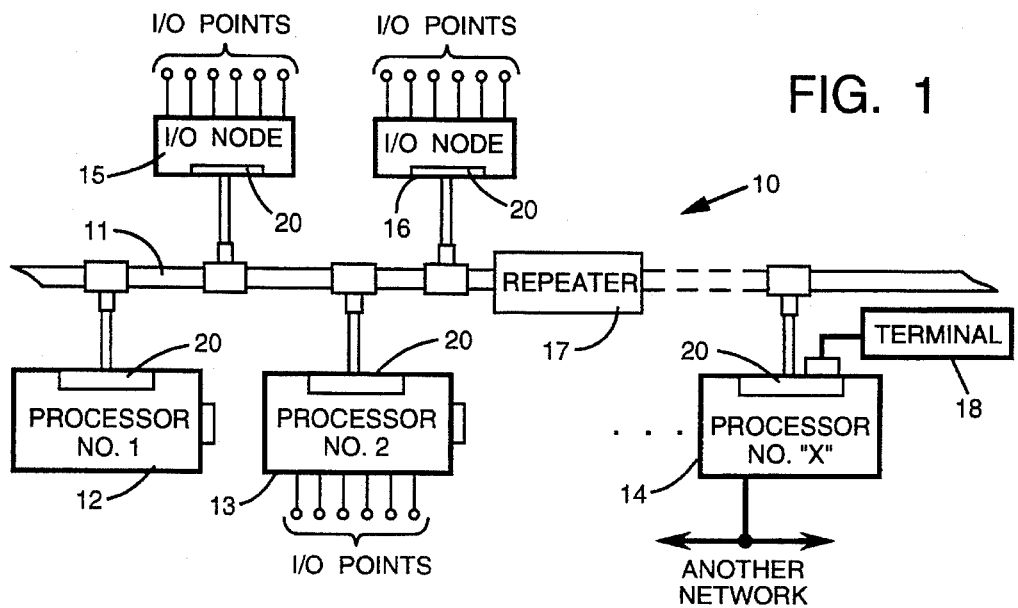
FIG. 1 is a representation of a communication network according to the present invention.

Initially referring to FIG. 1, an industrial control communication network 10 comprises a medium to which N number of stations 12–16 are connected to send and receive data. The network 10 may employ any suitable medium, such as coaxial or fiber optic cables, and may be based on any suitable topology, for example, bus, star or ring topologies. In the exemplary embodiment described herein, the interconnections of network 10 utilize a coaxial cable 11 connected in a bus topology. If the cable is relatively long, one or more repeaters 17 may have to be used to maintain a satisfactory signal level at all of the stations. The illustrated network 10 has several input/output interface circuits 15–16 and X number of processors 12–14, which may be programmable controllers, cell controllers or minicomputers, for example. The processor or interface circuit at each network station 12–16 is connected to the coaxial cable 11 by a node 20 having a unique address that is used to identify messages being sent to and from the associated station. A programming terminal 18 can be connected through any node 20 in order to communicate directly over the network, however the terminal is assigned a separate network address from the nodes.

The network 10 is referred to herein as a concurrent time division, multiple access (CTDMA) communications network in that both input/output data used by the processors 13–15 in operating the machinery, as well as control commands, system management and other messages, are concurrently exchanged over the same medium 11 with each node 20 being granted access to transmit messages in a time division multiplexed manner. The CTDMA network 10 utilizes a token bus type protocol in which an "implicit token" is passed from node to node in a prescribed order and the node 20 possessing the implicit token can transmit its messages. However, unlike other token passing networks, a token message is not passed among the nodes, rather each station monitors the network activity and has a register in which it keeps track of the node that it believes currently possesses the token.

Network Communication Protocol

Figure 2A:
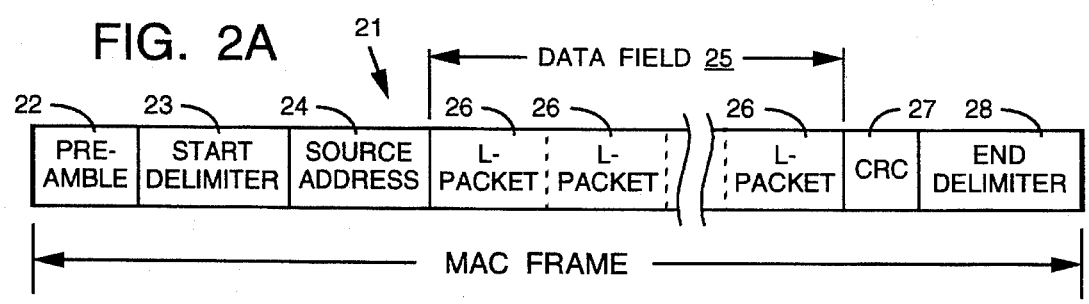
FIGS. 2A and 2B illustrate the subdivisions of a message frame sent by a station.

Referring to FIG. 2A, all messages regardless of the type of data being sent are formatted as a media access control (MAC) frame 21 having a maximum length of 517 bytes. Each time a station is granted access to send information over the network, it may send one MAC frame. The preferred network data modulation technique is conventional Manchester encoding in which each "bit" of Manchester encoded information comprises two physical symbols, or half bits. The Manchester half bits are referred to herein as "phy symbols", according to the "physical symbol" terminology. For example a "0" data bit is encoded by a "01" phy symbol sequence, whereas a "1" data bit is encoded by a "10" phy symbol sequence.

The MAC frame 21 begins with a thirty-two phy symbol preamble 22 and a sixteen phy symbol delimiter 23. A unique start delimiter 23 is used to establish a precise synchronization point in the incoming data in order for the receiver to accurately detect each phy symbol and determine the boundaries between pairs of consecutive phy symbols that encode a data bit. In addition to the start delimiter the MAC frame 21 terminates with an end delimiter which designates when the frame has ended.

Following the start delimiter 23 in the MAC frame 21 is the network address 24 of the source node of the message. The MAC frame 21 also has a data field 25 that is up to 510 bytes long and which is divided into basic messaging units referred to as Lpackets 26, which stands for "link-layer packets". Each Lpacket 26 represents a separate message or group of data and includes a unique identifying tag which each node 20 uses to determine whether it requires the information in that Lpacket. If a given node has several Lpackets to send, the Lpackets are placed in a queue and transmitted in the queued order. If there are more Lpackets 26 in the queue than can fit within one MAC frame, the remaining ones have to wait until the node again is granted access to the network.

Figure 2B:
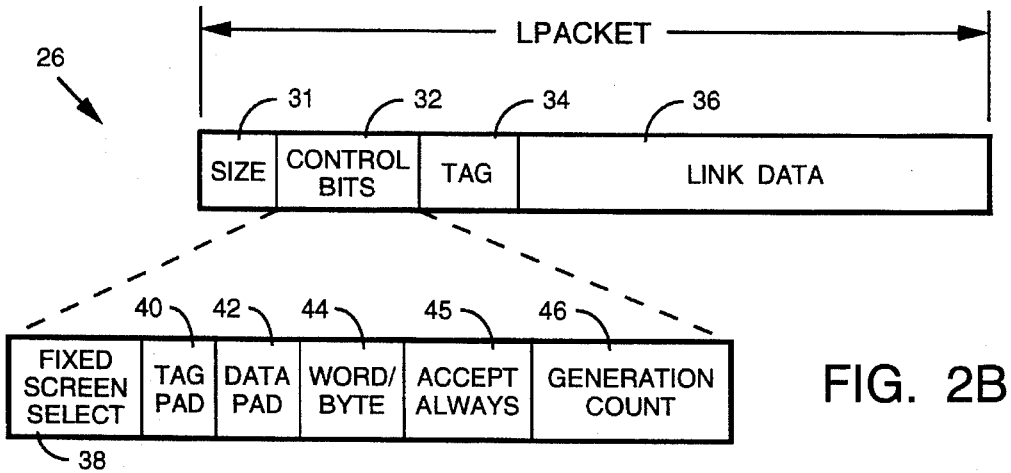

Each Lpacket 26 is subdivided into a series of fields as shown in FIG. 2B. The first field 31 is a byte which indicates the size, or length, of the Lpacket 26. The second field 32 contains eight control bits as indicated in the enlargement of that field in the drawing. The first control bit 38 designates one of two forms of message addressing, fixed or general purpose, used in the tag field 34 of the Lpacket. The fixed form includes a function code followed by a destination address. As will be described, a fixed mode message is inspected in each node 20 by a circuit referred to as a "fixed screener" to determine whether the node is interested in that Lpacket. As an example, the fixed mode is used to broadcast network management messages to all the nodes. The general purpose form of addressing allows the user to define the meaning of the tag according to a set of rules created for the specific network. For example, a unique tag number may designate a particular type or origin of I/O data that may be of interest to several nodes. A "general purpose screener" in each node inspects this latter form of tag to determine if the Lpacket is of interest to the node, as will be described.

The third and fourth control bits 40 and 42 are designated "tag pad" and "data pad" and indicate the alignment of the tag and data fields 34 and 36 in the Lpacket. As will be described, the tag and data fields have variable lengths and may or may not begin on a sixteen-bit word boundary in the Lpacket 26. The tag pad and data pad control bits 40 and 42 indicate that alignment and are used by a recipient node in separating the Lpacket fields. The next control bit 44 indicates whether the data contained in the Lpacket is in byte size or sixteen-bit word sized increments. The final section 46 comprises three control bits which provide a generation count. In some implementations of the CTDMA protocol a source node may send multiple copies of the same Lpacket to insure that at least one of them will reach the intended recipients. The generation count remains the same for each duplicate Lpacket and enables a recipient node to ignore the duplicates after one has been successfully received. When the generation count changes, the network nodes 20 know that the message content also has changed.

Following the control bits 32 in the Lpacket 26 is the tag 34 that has a variable number of bytes. The tag identifies the type of Lpacket enabling a recipient node to ignore, or screen out, the Lpackets that it is not interested in, keeping only those of interest. As will be elaborated upon, "screeners" in each node 20 accept only those Lpackets having selected tags. In order to maintain a boundary between the tag field 34 and the link data field 36 at an even number of words from the beginning of the data field 25, the tag field 34 must contain an even number of bytes in the MAC frame as exchanged with host devices 12, 13, 14 15, 16, etc. A tag with an odd number of bytes is indicated by the tag pad control bit 40 which signals circuitry in the sending node to delete a pad byte from the tag field before transmitting the Lpacket, and signals a recipient node to add a pad byte to the tag field before transferring the Lpacket to the host processor 102. This feature compacts the Lpacket for transmission, while enabling the recipient node to store the Lpacket with the tag on a word boundary.

The final field 36 of the Lpacket 26 contains the data being exchanged, referred to as "link data". The number of bytes in field 36 varies depending upon the amount of data the source node has to send. Since the data may be in byte or word sized increments, receiver circuits in the recipient nodes must be able to handle either format. As will be described, the receiver circuits are designed to handle word size increments. If the link data 36 has an odd number of bytes, as indicated by the data pad control bit 42, the recipient node must add a pad byte to the data field before storing the Lpacket into memory.

Referring again to FIG. 2A, after the Lpacket data field 25 in the MAC frame 21 is a cyclic redundancy code (CRC) word 27 that a recipient node uses to detect when the frame is corrupted during transmission. The final section 28 of the MAC frame 21 is the previously described unique end delimiter by which other stations can detect when the frame has ended. The end delimiter 28 also includes several explicit Manchester code violations in its phy symbol sequence.

Figure 3:
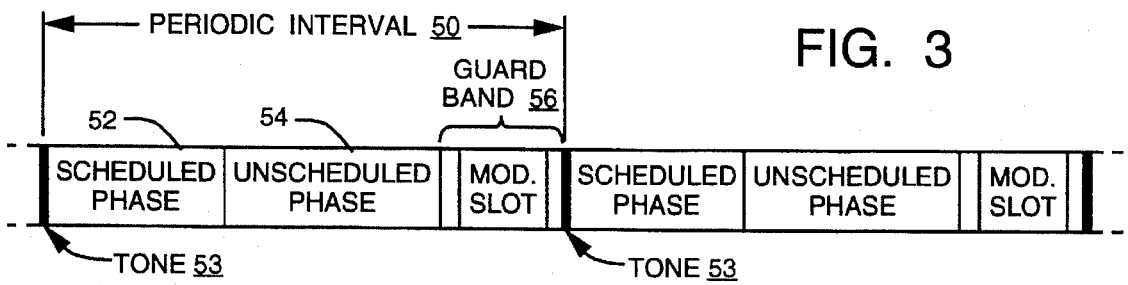
FIG. 3 illustrates the sequence in which messages are exchanged over /the communication network.

A node may transmit a MAC frame over the network 10 only at designated times to prevent frames from different nodes colliding with each other. The transmission of messages occurs during a series of reoccurring periodic intervals 50 as shown in FIG. 3. The length of the periodic interval is definable by the user as will be described. Each periodic interval 50 is divided into three segments: the scheduled phase 52 for I/O data, the unscheduled phase for other types of messages, and a guard band 56 for message coordination.

Figure 4A:
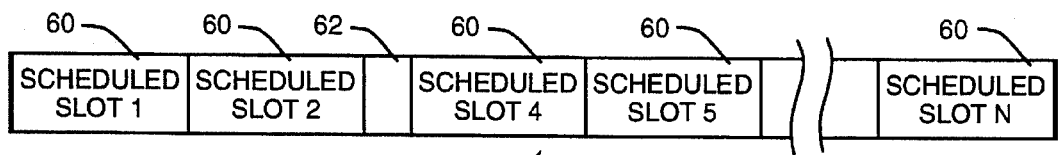
FIG. 4A depicts the order in which different stations on the network send messages during the scheduled phase of each periodic interval.

During the scheduled phase 52, each node 20 that has been designated as having I/O data is afforded an opportunity to transmit I/O data over the network. As depicted in FIG. 4A, the scheduled phase 52 is broken down into time slots 60 for each of the N nodes 20 on the network 10. As will be described, the scheduled phase can be configured so that not all N nodes will have access in situations where not every node transmits I/O data, such as the programming terminal 18. Each time-slot 60 may be as long as the time required to send a MAC frame 21 of the maximum length allowed by the network protocol (e.g. 510 bytes). Thus the periodic interval 50 must have a defined duration that is at least sufficiently long to permit every node 20 to send the maximum duration MAC frame 21.

A guard band 56 is located at the end of each periodic interval 50. When the guard band terminates, a "tone" signal 53 is generated within each node 20 to indicate the temporal boundary between two periodic intervals 50. Although this signal is not sent over the network, it enables each node to count time in synchronism. Upon generating the tone signal, the network node having the first address transmits a MAC frame of I/O data in scheduled slot 1. If that node 20 does not have any I/O data, it will transmit an empty MAC frame, i.e. one without any Lpackets. When a node has more I/O data than can be transmitted in a single MAC frame 21, the remaining data may be sent during the unscheduled phase 54, if that node has an opportunity to transmit in that phase.

At the end of the scheduled slot 1 for the first node, the node 20 with the next sequential network address transmits I/O data during scheduled slot 2. Note that in this example, either a node has not been assigned address 3 or the assigned node presently is inactive. Thus scheduled slot 3, otherwise occupied by I/O data from the third node, is replaced by a short "dead" period 62. The fourth network node listens during this dead period for the third node to transmit. The listening, or wait, period must be at least as great as the longest time for a signal to _, propagate between any two stations. If a transmission is not heard during the listening period, a "slot timeout" occurs and the fourth node concludes that the third node does not exist and begins transmitting I/O data over the network cable 11.

This sequence continues until all of the N nodes 20 on the network 10, which are configured for scheduled phase transmission, have been given an opportunity to send their I/O data, i.e. until the implied token has been passed once around the network. The actual duration of the scheduled phase 52 varies in relation to how many network nodes 20 have I/O data to send and the amount of I/O data each station sends. Depending upon these factors, it is conceivable that the entire periodic interval 50 can be consumed with a scheduled phase 52 and a guard band 56. However, as is more often the case, time remains following the scheduled phase 52 for an unscheduled phase 54.

During the so called unscheduled phase 54, the network nodes 20 are afforded an opportunity to send any remaining I/O data as well as other message types, such as ones containing control commands and manufacturing production information. Whatever time remains in the periodic interval 50 after the scheduled phase 52 is devoted to the unscheduled phase 54. Therefore each node 20 is not necessarily guaranteed time during the unscheduled phase 54 in which to send messages, however this is acceptable as the unscheduled phase messages by definition are less time critical than the I/O data.

Figure 4B:
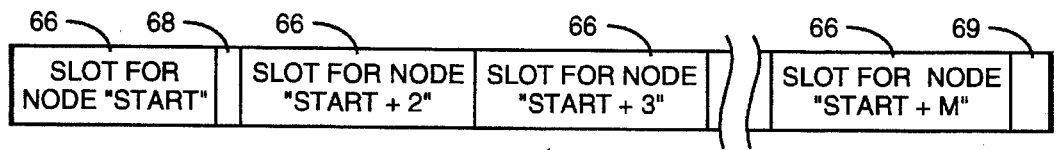
FIG. 4B depicts the order in which different stations on the network send messages during the unscheduled phase of each periodic interval.

If enough time remains, the nodes 20 may send MAC frames during the unscheduled phase 54 as depicted in FIG. 4B. Another distinction between the two phases 52 and 54 is that the first node allowed to transmit during the unscheduled phase changes every periodic interval. This first node is indicated by a network address designated by the variable START, which is stored by each node in an internal register. At the completion of the unscheduled phase 54, the value of START is incremented so that the node with the next numerical network address will have the first opportunity to send a message frame during the unscheduled phase of the next periodic interval. When the value of START reaches the highest address designated for the unscheduled phase, it is reset to the lowest address. Although the implicit token is passed only once in the scheduled phase 52, it is passed around as many times in the unscheduled phase as time allows.

Thus, at the beginning of the unscheduled phase the node having an address equal to START sends a message frame. When a node does not have this type of message to send, an empty message frame, i.e. one without any Lpackets, is sent. Then the node with the next network address (START +1) is permitted to send a message frame, and so on until the time remaining in the unscheduled phase is used up. In the exemplary unscheduled phase depicted in FIG. 4B, a gap 68 exists after the slot 66 for the START node, which indicates that address START + 1 either is unassigned or the assigned node is presently inactive, thus creating dead time on the network. As with the scheduled phase 52, if a node fails to start sending a message during its slot, the next node in the address sequence (e.g. START + 2) begins transmitting after a listening period.

One should also note that a small amount of time 69 remains after the node designated (START + M) stops transmitting near the end of the unscheduled phase 54. Because this amount of time 69 is too short for another MAC frame, a transmission does not occur. For this purpose, each node keeps track of the time remaining in the periodic interval. The number of nodes M that are afforded an opportunity to send a MAC frame 21 during a given unscheduled phase 54 depends upon the amount of time remaining in the periodic interval 50 after the scheduled phase 52 and the length of the frames each node has to send.

A period of time, referred to as a guard band 56, is reserved at the end of the periodic interval 50. During the guard band, one of the nodes 20 that is designated as the "moderator" broadcasts to the other nodes a MAC frame having a single Lpacket that contains network control information. The moderator is the active node with the lowest network address, and in addition to functioning as any other node, the moderator transmits network control information during the moderator slot of each guard band 56. The moderator Lpacket for the guard band message frame has the same format as illustrated in FIG. 2B, and has the fixed screen select bit set and a tag indicating a moderator Lpacket. Each moderator Lpacket contains an indication of the length of the periodic interval, the highest node addresses that are permitted access to the network in the scheduled and unscheduled phases and other information specifying how the stations access the network. The moderator counts the periodic intervals and each moderator Lpacket also contains the current periodic interval count and a modulus for the periodic interval counting. The use of the periodic interval count will be described subsequently. The MAC frame in the guard band 56 also enables synchronization of the clocks within each node 20 by providing a temporal reference point within each periodic interval.

Thus, the present CTDMA network communication protocol allows both input/output data and other message information to be sent over the same network medium in designated portions of the periodic intervals 50. During each periodic interval 50, priority is given to the I/O data which is used to control the machinery operated by the processors 13–15 on the network 10. Once every node 20 on the network has been afforded the opportunity to send its I/O data the remaining portion of the periodic interval is devoted to the transmission of other forms of information during an unscheduled phase. Although each network node 20 is not guaranteed the opportunity to sent a message during the unscheduled phase 54, over the course of several periodic intervals each node will receive that opportunity. If such opportunities do not occur frequently enough, the network operator may have to lengthen the periodic interval.

Communication Controller

Referring to FIG. 5A, the CTDMA protocol preferably is implemented on a single, very large scale (VLSI) integrated circuit, designated as the "S-Link Media Access Controller" (SMAC) 100. The SMAC 100 interfaces with the host processor 102 via a conventional bus 101. The bus 101 includes standard address, data and control signals as known in the art for a processor interface. The host processor 102 may be a conventional microprocessor system. The SMAC 100 is preferably configurable to permit adaptation to a variety of host processor bug configurations and protocols.

For example, data may selectively be transferred as eight or sixteen bit wide data. Similarly, "handshaking" signals for data transfer may be adapted for known interface protocols used by commercially available microprocessors. A facility is preferably provided by the SMAC 100 to "byte swap" data bytes according to the high/low byte precedence used by the connected host 102. Such interface features are described in more detail in copending U.S. Pat. No. 5,153,884 entitled "Intelligent Network Interface Circuit."

Each node 20 connects to the coaxial cable 11 via a tap 103 coupled to a transformer 104. Secondary windings 104a of the transformer 104 are connected to both the inputs of a receive amplifier/detector 105 and the outputs of dual, bi-phase drive amplifiers 106a and 106b. The output of the receive amplifier/detector 105 is connected as a NET IN signal 107 to the SMAC 100. The drive amplifiers 106a and 106b have their inputs connected to a NET OUT signal 108 and a NET OUT INV signal 109, respectively, generated by the SMAC 100. The drive amplifiers 106a and 106b are of the "output sink" type, such that when the NET OUT and NET OUT INV signals 108 and 109 are both low, both secondary windings 104a are high, or open. In that condition, the secondary windings 104a couple signals received from the network 10 to the receive/detector amplifier 105. For transmission, the drive amplifiers 106a and 106b are driven out of phase (high/low or low/high) by the NET OUT and NET OUT INV signals 108 and 109, respectively, thereby driving a transmit signal onto the secondary windings 104a of transformer 104. The transformer 104 then couples the transmitted signal onto the network 10.

The node 20 also includes connectors, PTC OUT 110 and PTC IN 111, which constitute a serial repeater port which carries all of the messages sent and received via the network 10 by the SMAC 100. This repeater capability is particularly advantageous, as it provides a fully functional network port at the PTC OUT and PTC IN connectors 110 and 111 without the expense or overhead of providing another explicit set of network interface hardware. The normal network access provided by the SMAC 100 for the host processor 102 is fully integrated with the repeating capability between the PTC OUT and PTC IN connectors and the network 10, enabling the SMAC to serve as the network repeater 17 in FIG. 1. As a result, the full matrix of communication paths are implemented. Specifically, the available transmission paths are: (1) data received from the PTC IN connector 111 is coupled to both the network 10 and the host 102; (2) data received from the host 102 is coupled to both the PTC OUT connector 110 and the network 10; and (3) data received from the network 10 is coupled to both the PTC OUT connector 110 and the host processor 102.

Another application of the PTC OUT and PTC IN connectors 110 and ill is for the connection of an optional programming terminal 18 to the node 20 as illustrated in FIG. 5A. It is preferred that all nodes 20 on the network 10 provide such connectors 110 and 111 for selective, temporary connection of the programming terminal 18 as needed. For example, the programming terminal 18 may be a hand held device which is carried from node to node in performing set up or diagnostic operations. The connectors 110 and 111 provide for bidirectional serial communication between the programming terminal 18 (when connected) and the SMAC 100. The PTC OUT and PTC IN connectors 110 and 111 of SMAC 100 connect to the PTC IN and PTC OUT signal connectors of a second SMAC 112 for the programming terminal 18. The host bus 101 to the second SMAC 112 is coupled to the programming terminal 18.

Due to the high data rate utilized on the network 10, a "screening" capability is provided by the SMAC 100 to select only certain data of interest for eventual forwarding to the host 102. As described above, each MAC frame includes one or more Lpackets 26, and each Lpacket includes a unique identifying tag. A limited internal screening capability is provided within the SMAC 100 to pick out certain Lpackets which are to be transferred to the host 102. In addition to the internal screening capability, the SMAC 100 also provides a screener bus 115 for connection to an optional external screen circuit 116. The external screen circuit 116 may be designed to recognize an essentially unlimited number of Lpackets 26 for transfer to the host 102. Both the internal and external screening capabilities are described in detail below.

The SMAC 100 also provides a SYNC OUT signal 120 which provides a capability for real time synchronization between different nodes 20 connected on the network 10. Because of the unique qualities of the CTDMA protocol, it is possible for each individual node 20 to synchronize activities at the local node to global, real time synchronized events which occur on the network 10. The SYNC OUT signal 120 is configurable to select one of several possible synchronization sources within the SMAC 100. Based on the selected synchronization source, the sync output signal 120 provides a capability to synchronize processes at the local node 20 with respect to an absolute, or "universal" time reference which is available to all nodes on the network. This allows the real time synchronization of events and systems, even though those events and systems may be on different network nodes 20. The local process to be synchronized may be a separate circuit or subsystem, as represented by the dashed lines 121, or alternatively may be a process operating the host processor 102 itself. In the latter case, the SYNC OUT signal 120 may optionally be connected as a discrete input signal into the host processor 102. Although a single SYNC OUT signal 120 is shown, multiple SYNC OUT signals may be utilized if desired to simultaneously provide other of the selectable "sync event" sources.

The SMAC

Referring to FIG. 5B, the major functional blocks within the SMAC 100 are a modem circuit 140, a receive processing circuit 142, a transmit processing circuit 141, a host interface circuit 143, an access control circuit 144, and a sync select circuit 145.

The modem 140 connects to the NET IN signal 107, the NET OUT signal 108, the NET OUT INV signal 109, the PTC IN signal 113 and the PTC OUT signal 114. A basic function of the modem 140 is to modulate and demodulate the Manchester encoded signals to and from the network 10 and PTC connectors 110 and 111. Another basic function of the modem 140 is to generate the clock signals used throughout the SMAC 100 for timing purposes. A PHY CLOCK signal 150 is generated by the modem 140 at the physical symbol rate, or twice the bit rate. The preferred bit rate in this embodiment is five megabits per second, and the PHY CLOCK signal 150 therefore has a frequency of ten megahertz. The modem 140 also generates other clock signals shown as DATA CLOCKS bus 163, which are discussed as appropriate hereinafter.

A third function of the modem 140 is to accept data supplied by the host processor 102 for transmission, and to likewise forward received data to the host 102. The transmit processing circuit 141 provides host transmit data and other control signals to the modem 140 via a dedicated output bus 161. The receive processing circuit 142 accepts the received data and appropriate control signals from the modem 140 via a dedicated input bus 162. The particular operation of the circuits 141 and 142 in processing the respective transmit and receive data is described in detail below.

Fourthly, the modem 140 implements a selection matrix for performing the repeater function between the host processor 102, PTC connectors 110 and 111, and the network 10. Host transmit data received from the transmit processing circuit 141 is "looped back" in the modem 140 to integrate the data selection and repeating process. Data received on the NET IN input 107 is coupled to both the line for the PTC OUT signal 114 and to the receive processing circuit 142. Data received on the line for the PTC IN signal 113 is sent to the receive processing circuit 142, and is also repeated out to the network 10 over the NET OUT and NET OUT INV signal lines 108 and 109, respectively.. Lastly, host transmit data from the transmit processing circuit 141 is sent to three destinations: the line for PTC OUT signal 114, the lines for the NET OUT and NET OUT INV signals 108 and 109, respectively, and to the receive processing circuit 142. The "loop back" of host transmit data to the receive processing circuit 142 allows the host processor 102 to send "messages" to the SMAC 100. This message loop back is the preferred method for communication of certain information between the host processor 102 and the SMAC 100 because it utilizes the inherent message processing capabilities of the SMAC 100. For example, special station management "messages" are provided for direct processing by the SMAC 100 without action by the host processor 102. Those "messages" can be received from either the network 10 or the host processor 102, but in both cases the "message" is processed through the receive processing circuit 142. Pad bytes are appended to the end of each station management message to ensure that the SMAC 100 has adequate time to process the message.

Finally, the modem 140 functions to generate signals which are used to operate the CTDMA access process, specifically a FRAME ESTIMATE signal 165 and an RX READY signal 166. Referring momentarily to FIG. 6, the FRAME ESTIMATE signal 165 indicates that a MAC frame 21 is "estimated" to be in progress (either transmit or receive). In the case of a received frame, this "estimate" is made in a manner which makes a qualitative estimate of the MAC frame preamble 22 as an early, although not infallible, indication that a MAC frame 21 is in progress. The other control signal, RX READY 166, becomes true only after reception of a predetermined start delimiter sequence, exactly and without error. The start delimiter 23 is unique in that it is constructed of individual phy symbols instead of conventional Manchester encoded data bits. In fact, the preferred start delimiter 23 intentionally includes several explicit Manchester code violations in the phy symbol sequence. A similarly unique end delimiter 28 is provided with a different phy symbol sequence, also including Manchester code violations, to detect the end of a MAC frame 21. Once the start delimiter sequence has been successfully detected, the RX READY signal 166 becomes true. The RX READY signal 166 then remains true until another Manchester code violation is detected. Normally, a received MAC frame would not contain any Manchester code violations between the start and end delimiters. In that case, the RX READY signal 166 would remain true until the first intentional Manchester code violation is detected in the end delimiter.

Referring again to FIG. 5B, the receive processing circuit 142 takes in serial data and other status indications from the modem 140, and converts the serial data to an eight bit wide "byte" format. The receive processing circuit 142 forwards the byte data over an RX byte bus 170 to the host interface circuit 143. Control signals for the transfer are provided on an RX FIFO control bus 171. The receive processing circuit 142 also is primarily responsible for screening operations and includes a general purpose, user screen circuit 172 which may be programmed to "recognize" a limited number of Lpacket tags of interest. The receive processing circuit 142 also is connected to the external screener bus 115 for external screening operations. The access control circuit 144 works in conjunction with the receive processing circuit 142 to implement a "fixed" screener function. This fixed screener is used to recognize predetermined, fixed Lpacket tags that carry station management information.

In addition, the receive processing circuit 142 maintains an "interval number" count. As discussed above, each periodic interval is numbered in ascending order according to a configurable modulus. The receive processing circuit 142 maintains the "interval number" of the current periodic interval for use in some screening function modes. The interval number is also provided directly to the host interface 143 via bus 174.

The receive processing circuit 142 generates an LPACKET BOUNDARY signal 175 at the beginning of each Lpacket 26 and at the end of the last Lpacket in a MAC frame 21. The LPACKET BOUNDARY signal 175 is coupled to the access control circuit 144 to provide notification of the Lpacket boundary so that appropriate processing can be initiated.

The access control circuit 144 coordinates all functions on the SMAC 100, including the implementation of the CTDMA protocol, data transmission, data reception, data exchange with the host processor 102, and the generation of the sync output signal 120. The access control circuit 144 includes a reduced instruction set computer, referred to herein as RISC processor 400 (FIG. 10), in addition to several dedicated logic circuits. The RISC processor 400 is interfaced to a RISC bus 180 which connects the access control circuit 144 to other processing circuits on the SMAC 100. The RISC bus 180 includes address, data and control lines, and provides for communication of command and status information between the RISC processor 400 and the connected circuits. In particular, the RISC processor 400 utilizes the RISC bus 180 to generate command strobes, test individual status bits, and even read "byte" data in parallel, from selected locations within the SMAC 100. While most I/O operations to the access control circuit 144 are made via the RISC bus 180, some discrete inputs and outputs also are employed, and these signals are described where appropriate below.

The access control circuit 144 also produces several signals which are pertinent to operation of the CTDMA protocol, and those signals are grouped together into a bus labeled "sync" bus 176. The sync bus 176 connects to the sync select circuit 145 to provide the source signals from which the sync select circuit 145 can generate the SYNC OUT signal 120. The sync bus 176 also connects to the receive processing circuit 142 and to the host interface 143.

Referring still to FIG. 5B, the transmit processing circuit 141 generates a serial stream of phy symbols for output from the SMAC 100. The serial phy symbol stream and other associated control signals are connected to the modem circuit 140 by the output bus 161. The transmit processing circuit 141 performs the functions of generating the preamble 22, start delimiter 23, data field 25 and end delimiter 28 for an outgoing MAC frame 21. The preamble, start delimiter and end delimiter are fixed in format and are generated internally by the transmit processing circuit 141. The data for transmission in the data field 25 of the MAC frame is provided to the transmit processing circuit 141 either directly from the host interface circuit 143 or from the access control circuit 144 via the RISC bus 180. For "normal" output data (i.e. from the host 102), the data field contents are supplied to the transmit processing circuit 141 directly by the host interface circuit 143. However, another important concept is the capability of the SMAC 100 to automatically respond to certain station management commands, in some cases by actually transmitting an appropriate station management response message. When required, the station management response message is sent without direction from, or disruption of, the host processor 102. The station management response messages are generated automatically by the RISC processor in the access control circuit 144, and the corresponding data for transmission is sent to the transmit processing circuit 141 by way of the RISC bus 180.

The transmit processing circuit 141 generates a TX READY signal 181 to indicate that the body of a MAC frame 21 is currently being transmitted. That is, the TX READY signal 181 is activated after transmission of the start delimiter 23 and deactivated after transmission of the end delimiter 28. The TX READY signal 181 is therefore roughly analogous to the RX READY signal 166 used during reception. The TX READY signal 181 is connected to the host interface circuit 143, the access control circuit 144 and the sync select circuit 145 for use as described separately below. Another transmit indicator generated by the transmit processing circuit 141 is a TX BUSY signal 182, which is applied to the access control circuit 144. A true TX BUSY signal 182 indicates that the transmit processing circuit 141 is currently in the process of acquiring an Lpacket from the host interface 143. In particular, the TX BUSY signal 182 is not true during the transmission of a header (fields 22–24) or a trailer (fields 27–28) of a MAC frame 21, nor while the access control 144 is sending a response. The TX BUSY signal 182 is used to inform the access control 144 when the transmit processing circuit 141 has completed transmission of an Lpacket. When the TX BUSY signal goes false, the access control circuit 144 is free either to initiate another Lpacket transmission or to terminate the MAC frame 21.

The host interface circuit 143 is a "stream" oriented interface for the host processor 102. Each stream is a logical grouping of memory locations organized in a first in, first out (FIFO) manner within the host interface circuit 143i. A total of five streams are preferably implemented; three output (transmit) streams and two incoming (receive) streams. The three output streams are designated TX A, TX B and TX C. Data pending transmission is placed in the streams TX A through TX C by the host processor 102 using the host bus 101. A capability is also provided for the host processor 102 to "mark" the output streams as "ready for transmission". A STREAM STATUS bus 185 is provided by the host interface circuit 143 to indicate which of the three output streams have been marked as "ready for transmission". The access control circuit 144 is also appraised of the "ready for transmission" status via the RISC bus 180. When permission to transmit has been acquired by the node 20 according to the CTDMA protocol, the access control circuit 144 issues appropriate instructions over the RISC bus 180 to instruct the transmit processing circuit 141 to commence transmission. At the same time, the RISC bus 180 is also used to designate one of the "ready" streams in the host interface 143 for actual transmission. The information as to which stream is to be transmitted is latched by the host interface 143, and provided to the transmit processing circuit 141 via a "frame start" bus 186. The host interface circuit 143 then places the first, or top most data word for the selected stream onto a "TX word" bus 187. The TX word bus 187 transfers the current word to the transmit processing circuit 141. The TX word bus 187 is 16 bits wide, such that two bytes at a time are transferred. Once the transmit processing circuit 141 has latched the current word on the TX word bus 187, a TAKE WORD signal 188 is activated. The TAKE WORD signal 188 commands the host interface 143 to advance the currently selected stream to the next data word for transmission.

During transmission from the host interface 143, the transmit processing circuit 141 activates a TX BUSY signal 182. The TX BUSY signal 182 is connected to the access control circuit 144, and is activated for the duration of each Lpacket that is transmitted from the host interface. A TX READY signal 181 becomes true after transmission of the start delimiter 23, and remains true for the duration of the transmission. The TX READY signal 181 is connected to the access control circuit 144, the host interface 143, and as an input to the sync select circuit 145.

The sync select circuit 145 functions to select one of multiple signal sources for use in generating the SYNC OUT signal 120. The RISC bus 180 connects to the sync select circuit 145, and is used to control selection of the signal source.

With this overview of the SMAC 100 in mind, a more elaborate description of its subsystems will be understood.

SMAC Modem

Referring to FIG. 7, the modem 140 processes the PTC IN signal 113 and NET IN signal 107 in an RX decode circuit 250. The RX decode circuit 250 monitors each of the signals 113 and 107 to determine which of the two is to be selected for subsequent processing. In normal operation, only one of the signals 113 and 107 will be active at a time. The incoming data from the selected source is synchronized to the PHY CLOCK signal 150 and is output as an RX PHY SYMBOLS signal 251. Another output from the RX decode circuit 250 is designated as the RX FRAME signal 252. The RX FRAME signal 252 is activated when the selected incoming data on the RX PHY SYMBOLS signal 251 is recognized as a valid preamble 22 (see FIG. 6). A PTC ACTIVE signal 253 is also provided by the RX decode circuit 250 to indicate when the PTC IN signal 113 is selected as the active channel. The PTC ACTIVE signal 253 is coupled to both a TX control circuit 255 within the modem 140, and externally to the receive processing circuit 142 via input bus 162. The PTC ACTIVE signal 253 is used by those respective circuits 255 and 142 as an indication that the programming terminal 25 is active, which in turn dictates special processing actions which are described below.

A TX ENABLE signal 256 and an END BLANKING signal 257 are received from the transmit processing circuit 141 on output bus 161. The TX ENABLE signal 256 and END BLANKING signal 257 are coupled to both the RX decode circuit 250 and the TX control circuit 255. In the RX decode circuit 250, the signals 256 and 257 are used in selecting the active channel as described further below. For the TX control circuit 255, the signals 256 and 257 are used for control of the transmit process, also as described below.

The modem circuit 140 includes a clock generator circuit 260 which generates data clocks and other synchronizing signals which are used throughout the SMAC 100. In addition to the PHY CLOCK signal 150 and the clock generator circuit 260 also generates a BIT CLOCK signal 261, a BYTE CLOCK signal 262 and a BYTE PULSE signal 151. The BIT CLOCK, BYTE CLOCK and BYTE PULSE signals 261, 262 and 151 and 262, respectively, are coupled to other circuits via the DATA CLOCKS bus 163, while the BIT CLOCK and BYTE CLOCK signals 261 and 262, respectively, are also used locally within the modem 140. The BIT CLOCK signal 261 has a frequency of five megahertz, or half the phy symbol rate, since there are two phy symbols per Manchester data bit. Further, the BIT CLOCK signal 261 is timed such that its active edge corresponds to the "true" phy symbol portion of each Manchester bit. As is known in the art, each Manchester bit comprises two phy symbols which must be binary complements of each other to be considered a valid Manchester code. That is, one phy symbol, or Manchester half-bit is "true" data, while the other half of the Manchester bit is inverse or complement data. Thus, by sampling the phy symbol stream with the active edge of the BIT CLOCK signal 261, the actual (i.e. "true") Manchester data is recovered. The BYTE CLOCK signal 262 is equal to the bit clock divided in frequency by eight, such that the active edge occurs once per eight bits The BYTE PULSE signal 151 is aligned to the "byte" boundary of the Manchester data in a novel manner described in detail below. Once aligned, the BYTE PULSE signal 151 is made "true" for one active edge of the PHY CLOCK signal 150 to flag the completion of a received or transmitted byte (eight bits). In that sense, the BYTE PULSE signal 151 is not a clock signal per se, but rather a gating signal which is set "true" just prior to an active edge of the PHY CLOCK signal 150.

Proper alignment of the BIT CLOCK, BYTE CLOCK and BYTE PULSE signals 261, 262 and 151 is an important function of the SMAC 100. A delimiter detect circuit 265 is utilized to detect an exact sequence of phy symbols which constitutes a "start delimiter" 23 and an "end delimiter" 28. The start and end delimiters themselves are novel, in that they are based on patterns of phy symbols instead of Manchester data bits. As noted above, the preferred start and end delimiter phy symbol patterns are constructed to intentionally include invalid Manchester codes, and would simply be rejected as "erroneous" data by prior Manchester processing circuits (not shown). A detailed description of the start and end delimiter construction and use is described in detail below. In general, the start delimiter 23 is used to establish a precise "synchronizing" point for the incoming data. Referring temporarily to FIG. 6, when a start delimiter 23 is successfully detected, the delimiter detect circuit 265 activates an ALIGN BYTE signal 266 to indicate that the incoming phy symbols are at an exact byte and bit boundary. At that precise moment, the last phy symbol of the start delimiter has just been received, and the first phy symbol of the first bit and the first byte of the source address 24 will be the next signal received. The ALIGN BYTE signal 266 causes the clock generator circuit 260 to synchronize all of the clock signals BIT CLOCK 261, BYTE CLOCK 262 and BYTE PULSE 151, respectively, to that precise bit/byte boundary.

The modem 140 utilizes a loop back configuration to select between received data or outgoing transmit data for subsequent processing by the receive processing circuit 142. In particular, a pair of multiplexers 267 and 268 with two inputs each are utilized. Serial phy symbols for transmission are provided by the transmit processing circuit 141 on a TX PHY SYMBOLS line 269, via output bus 161. One multiplexer 267 is used to select between either the RX PHY SYMBOLS 251 or TX PHY SYMBOLS 269. The output of multiplexer 267 is referred to as a PHY DATA signal 270, and is coupled to both the input bus 162 and other circuits within the modem 140 as described in detail below. The PHY DATA signal 270 may therefore be either transmit or receive phy symbols, depending upon the selection of multiplexer 267. The other multiplexer 268 is used to select between either the RX FRAME signal 252 or the TX ENABLE signal 256. In this context, the TX ENABLE signal 256 is utilized as a "frame" signal, since the TX PHY SYMBOLS 269 are considered to be "in frame" whenever the TX ENABLE signal 256 is true. The RX FRAME signal 252 is generated by the RX DECODE circuit 250 as an "estimate" that an incoming MAC frame is in progress. Therefore, the output of multiplexer 268 is designated as the FRAME ESTIMATE signal 165, and will reflect the "in frame" status of the selected RX PHY SYMBOLS 251 or TX PHY SYMBOLS 269. A TX RESERVE signal 271 is provided on the output bus 161 from the transmit processing circuit 141, and is connected to a select input on each of the multiplexers 267 and 268 to select between the respective RX and TX signals. The TX RESERVE signal 271 becomes "true" at the beginning of a transmit sequence, and remains "true" for the duration of the transmission plus an additional or "reserve" time after the end of the transmission. The extra "reserve" time provides a "quiet" period without network activity after the end of the transmission. The "reserve" time after transmission has ceased is also referred to herein as a blanking interval. The END BLANKING signal 257 is used by other circuits described below, and signifies that the blanking interval has expired.

Continuing to refer to FIG. 7, the PHY DATA signal 270 is coupled to both an AND gate 274 and a TX bi-phase pre-driver circuit 275. The AND gate 274 and the TX bi-phase pre-driver circuit 275 both receive separate "enable" inputs 276 and 277, respectively, from the TX control circuit 255. The TX bi-phase pre-driver 275 provides the NET OUT and NET OUT INV outputs 108 and 109, respectively. When the enable signal 277 into the TX bi-phase pre-driver 275 is "false", both the NET OUT and NET OUT INV outputs 108 and 109, respectively, are the same, e.g. logic low level, so that no net voltage is delivered to the transformer 104. When the enable signal 277 into the TX bi-phase predriver circuit 275 is "true", the NET OUT and NET OUT INV outputs 108 and 109, respectively, are made complimentary with respect to each other, and change state according to the connected PHY DATA signal 270. Thus, when the TX bi-phase pre-driver 275 is enabled, the NET OUT and NET OUT INV outputs 108 and 109, respectively, provide a differential signal for driving the PHY DATA 270 onto the network 10 via transformer 104.

In conjunction with the loop back capability described above, the TX control circuit 255 implements the above described repeater capability between the PTC OUT and PTC IN connectors 110 and 111, the host 102 and the network 10. In a first case, when incoming data is being received on the PTC IN line 113, the PTC ACTWE signal 253 will be "true". In that case, the enable signal 276 to AND gate 274 will be set "false" by the TX control circuit 255 to prevent the PHY DATA signal 270 from being fed back on the PTC OUT line 114. Instead, the enable signal 277 for the TX bi-phase pre-driver 275 is set "true" and the PTC IN data 113, now on the PHY DATA line 270, is coupled through the TX bi.-phase pre-driver 275 onto the network 10.

In a second case, when network input data is being received on the NET IN signal 107, the PTC IN signal 113 will be silent at first under normal operation, and the PTC ACTIVE signal 253 will be "false". In that case, the NET IN data 107 is selected as the PHY DATA signal 270. In that case, the TX control circuit 255 activates the enable line 276 to AND gate 274. The NET IN data on the PHY DATA line 270 is thereby routed through to the PTC OUT connector 110. In that way, incoming data from the network 10 is automatically repeated to the PTC OUT connector 110 and to the programming terminal 18 (if connected). While receiving data on the NET IN signal 107 (i.e. PTC ACTIVE 253 and TX ENABLE 256 are both "false"), the TX control circuit 255 deactivates the line with the TX bi-phase pre-driver enable signal 277 to prevent the incoming data from being driven back onto, and interfering with, the incoming network data. After reception of either the NET IN signal 107 or the PTC IN signal 113, the other signal will be blanked, since outgoing data will soon appear there due to the repeating function.

In a third case, the node 20 will be enabled for transmission Crx ENABLE signal 256 "true"), and both the PTC IN and NET IN signals 113 and 107, respectively, will normally be silent. The TX ENABLE and END BLANKING signals 256 and 257, respectively, are coupled into the TX control circuit 255 for determining the transmit status of the node 20. When transmission is enabled, the TX PHY SYMBOLS 269 will be coupled through to the PHY DATA line 270, and the TX control circuit 255 will enable both lines 276 and 277 to the AND gate 274 and the TX bi-phase pre-driver circuit 275, respectively. In that way, the transmit data is coupled to both the PTC OUT connector 110 and the network 10.

The PHY DATA signal 270 is also coupled to the delimiter detect circuit 265 which performs recognition of the start and end delimiters 23 and 28, and generates several signals utilized in the subsequent processing of the message frame. The particular operation of the delimiter detect circuit 265 is described in complete detail below. In general, the delimiter detect circuit 265 continually scans the PHY DATA signal 270 in an attempt to recognize the exact sequence of phy symbols which constitutes a valid start delimiter 23. As previously described, since the start delimiter 23 intentionally includes phy symbol sequences which are Manchester code violations, it is necessary to look at all phy symbols, and thus the PHY CLOCK signal 150 is coupled into the delimiter detect circuit 265. Once a valid start delimiter 23 has been recognized, the delimiter detect circuit 265 activates the RX READY signal 166, indicating the exact starting point of the first data bit and the first data byte of the message frame (see also the timing diagram in FIG. 6). After the start delimiter 23, further Manchester violations are neither expected nor permitted until the known Manchester violations in the end delimiter 28. The delimiter detect circuit 265 also checks each data bit individually for a Manchester code violation, and activates a VIOLATION output signal 280 to indicate any such violation. The VIOLATION signal 280 is coupled through the input bus 162 to the receive processing circuit 142. After receipt of a valid start delimiter, if another Manchester violation is detected prior to receipt of a valid end delimiter, a BAD FRAME signal 281 is activated, and coupled through the input bus 162 to the receive processing circuit 142.

In addition, the CTDMA protocol allows for the intentional abort of a message frame 21. An intentional abort is signified by receipt of a second start delimiter after the first start delimiter which started the MAC frame. If a second start delimiter sequence is detected, an RX ABORT signal 282 is activated by the delimiter detect circuit 265 and coupled through the input bus 162 to the receive processing circuit 142.

A CRC check circuit 285 is provided for use in conjunction with the delimiter detect circuit 265 to verify that an incoming message frame includes a valid cyclic redundancy code (CRC)27. The CRC check circuit 285 receives the PHY DATA signal 270, and is docked by the BIT CLOCK signal 261 so that only the "data" half-bit of the PHY DATA 270 is sampled for computing the CRC. Prior to receipt of a valid start delimiter, the CRC check circuit 285 is held reset by a RESET CRC signal 286 provided by the delimiter detect circuit 265. Once a valid start delimiter 23 has been received, the RESET CRC signal 286 is released, and the CRC check circuit 285 begins computation. The CRC check circuit 285 provides a CRC OK output 287 to the delimiter detect circuit 265 to indicate successful CRC computation. The delimiter detect circuit 265 samples the CRC OK signal 287 at the appropriate time after message completion as described below. The CRC check circuit 285 operates in a conventional manner, known to those skilled in the art, to generate a sixteen bit word-wise check sum of the incoming data. The CRC OK signal 287 is activated whenever the computed checksum is equal to a fixed, predetermined sixteen bit value.

Normally, once a valid start delimiter 23 has been received, processing of the message frame 21 will proceed without activation of the VIOLATION, BAD FRAME or RX ABORT signals 280–282, respectively. At the end of the message frame, an end delimiter 28 will be received which again includes intentional Manchester code violations. When that occurs, it is normal and expected to receive an indication on the VIOLATION signal 280 at some point before the end delimiter 28 has been completely detected. As soon as the first Manchester code violation in the end delimiter is detected, the RX READY signal 166 is made "false", and the delimiter detect circuit 265 continues to scan for recognition of the full end delimiter. Once the full end delimiter 28 has been received and detected exactly by the delimiter detect circuit 265, the CRC OK signal 287 is sampled. According to the state of the CRC OK signal, either a CRC GOOD signal 290 or a CRC BAD PULSE signal 291 is activated by the delimiter detect circuit 265. Both of the CRC status signals 290 and 291 are coupled through the input bus 162 to the receive processing circuit 142.

The delimiter detect circuit 265 is also connected to the RISC bus 180. Certain of the status indications generated by the delimiter detect circuit 265 are thereby available for input to the RISC processor 400 by appropriate decoding as described in detail below.

Referring to FIG. 8, the delimiter detect circuit 265 in the modem 140 includes a fifteen stage shift register 340 which is clocked at the phy symbol rate by the PHY CLOCK signal 150. The PHY DATA signal 270 is connected as a serial data input to the shift register 340, causing the binary state of each sequential phy symbol to be shifted into the shift register 340. The shift register 340 provides a parallel output of all fifteen stages. The fifteen parallel output lines of the shift register 340 are connected to fifteen lines of a parallel bus 341. The bus 341 includes a total of sixteen lines, with the sixteenth line (other than the fifteen lines from register 340) being connected to the PHY DATA signal 270. In that way, the bus 341 contains a sixteen phy symbol "snapshot" made up of the latest, or current, phy symbol being received (PHY DATA signal 270) plus the fifteen previous phy symbols (from register 340). It is important to note that the bus 341 contains raw phy symbols, not data bits. The sixteen phy symbols occupy "eight data bits worth" of space, but are maintained in separate phy symbol form, without regard to any possible data interpretation. The sixteen phy symbol sequence on bus 341 is connected to both a start delimiter detect logic circuit 342 and an end delimiter detect logic circuit 343. The start delimiter detect logic circuit 342 includes appropriate logic gates to detect a specific phy symbol pattern (i.e. the "start delimiter") on the bus 341.

When the phy symbol pattern of the bus 341 exactly matches the start delimiter pattern, the start delimiter detect logic 342 activates a START DELIM DETECTED signal 345. At that exact moment, the start delimiter 23 has just been received, and the incoming PHY DATA 270 is known to be at a bit and byte boundary. The START DELIM DETECTED signal 345 is connected to a delimiter detect state machine 346 to indicate the moment at which the start delimiter 23 is detected.

In a similar manner, the end delimiter detect logic 343 constantly scans the bus 341 for the occurrence of a valid end delimiter sequence 28. When an end delimiter 28 is detected, the end delimiter detect logic 343 activates an END DELIM DETECTED signal 347 to indicate the same to the delimiter detect state machine 346.

The delimiter detect circuit 265 includes a status logic circuit 350 for producing the status signals RX ABORT 282, CRC GOOD 290, and CRC BAD PULSE 291. The status logic circuit 350 is docked by the PHY CLOCK signal 150, and receives the CRC OK signal 287 as an input. Three other inputs into the status logic circuit 350 are provided by the delimiter detect state machine 346, namely an ABORT signal 351, a CHECK CRC signal 352, and a HOLD STATUS signal 353. The status logic circuit 350 includes registers clocked by the PHY CLOCK signal 150 for holding the states of the RX ABORT and CRC GOOD signals 282 and 290, respectively. The delimiter detect state machine 346 activates the ABORT signal 351 when an abort condition is detected, as described below. The CRC GCD signal 290 is produced by ANDing the CHECK CRC signal 352 with the CRC OK signal 287 and latching the result. The delimiter detect state machine 346 activates the CHECK CRC signal 352 only at a time when the CRC is to be tested. When the HOLD STATUS signal 353 is received by the status logic circuit 350, the state of its output signals are held despite changes in the input signals which otherwise would affect the output signals.

The delimiter detect circuit 265 also includes a violation detect circuit 360, which tests the incoming phy symbols for Manchester code violations, and activates the VIOLATION signal 280 if a violation is detected during receipt of a message frame 21.

Referring still to FIG. 8, in addition to the input and output signals described above, the delimiter detect state machine 346 also receives as inputs the BYTE PULSE signal 151, the PHY CLOCK signal 150 and a SHUTDOWN signal 369. The PHY CLOCK signal 150 is used as the basic dock for operating the state machine, while the BYTE PULSE signal 151 is used by the state machine in cases where state transitions are made on "byte" boundaries. The SHUTDOWN signal 369 is generated by a decode command instruction circuit 368. The decode command instruction circuit 368 is connected to the RISC bus 180 and includes appropriate logic gates to decode the address and command lines on the RISC bus 180 to detect a predetermined pattern which represents issuance of the "shutdown" command by the RISC processor. In this manner, the RISC processor is able to in effect issue a "software reset" to the delimiter detect state machine 346 when abnormal conditions are detected. The outputs generated by the delimiter detect state machine 346 include the VALID FRAME signal 365 described above, plus the ALIGN BYTE signal 266, the RX READY signal 166 and the BAD FRAME signal 281.

The delimiter detect state machine 346 is implemented as a conventional state machine, with inputs and outputs as just described. A state transition diagram is shown in FIG. 9, in which each rectangular box represents a "state" and is labeled with an associated state name. Where any of the outputs are assigned a new value in a state, a dashed line is included below the state name, and the new output assignments are listed below the dashed line. The input conditions necessary for state transitions are shown outside of the "state" boxes adjacent to an arrow indicating the next state for that transition. In the transition conditions, the condition "PHY CLOCK" has been omitted for simplicity, since it is understood that all state transitions are clocked by the active edge of the PHY CLOCK signal 150.

The delimiter detect state machine 346 is reset upon power-up or upon activation of a conventional hardware reset (not shown). The "reset" entry state is represented by an oval 370. From reset 370, an initial "idle" state 371 is entered unconditionally. In the "idle" state 371, the output signals are initialized as indicated. The delimiter detect state machine 346 remains in the "idle" state 371 until the START DELIM DETECTED signal 345 is activated. At that time, a transition is made to a "start" state 372, and simultaneously, an active pulse is issued on the ALIGN BYTE signal 266. As described above, the ALIGN BYTE signal 266 signal causes the bit and byte clocks to align on the bit and byte boundary following the start delimiter 23. In the "start" state 372, the RX READY signal 166 and the VALID FRAME signal 365 are set "true" to indicate the start of a MAC frame 21. Provided that no Manchester violations after the start delimiter 23 are detected, the "start" state 372 remains active for one "byte" time, i.e. until the next activation of the BYTE PULSE signal 151. At that point, a transition is made to a "second byte" state 373. In the "second byte" state 373, the RESET CRC signal 286 is released to allow the CRC check circuit 285 to begin accumulating the CRC checksum. Again, assuming no further Manchester violations, the "second byte" state 373 is exited after one "byte" time, and a transition is made to a "third byte" state 374. Similarly, the "third byte" state 374 exits after one "byte" time to a '74+ bytes" state 375. Prior to receiving four complete bytes, an incoming message will not be accepted, since the minimum length for any MAC frame is four bytes. Once the "4+ bytes" state 375 has been reached, however, a message is expected to be in progress. The "4+ bytes" state 375 then remains active for the duration of the MAC frame. Exit from the "4+bytes" state 375 is taken only upon occurrence of a Manchester violation, as indicated by the VIOLATION signal 280. At that time a transition is made to a "violation check" state 376. The detected violation is expected under normal conditions to be the intentional Manchester violation in the end delimiter 28, but this is not necessarily the case. A Manchester violation may instead be either a second start delimiter or an actual Manchester error. No matter how the "violation" occurred, the RX READY signal 166 is forced off, since the current MAC frame must now end, either normally or by error.

In the "violation check" state 376, a wait is performed until the byte in which the violation occurred has been completed. At that time, a test can be performed as to whether the "violation" was in fact a valid end delimiter 28, or whether the "violation" was due to some other condition. When the byte in question completes (BYTE PULSE signal 151 is "true"), and if the END DELIM DETECTED signal 347 has been activated, then a transition is made to a "normal termination" state 377. In the "normal termination" state 377, the HOLD STATUS signal 353 is dropped, allowing new status conditions to be entered by the status logic circuit 350. At the same time, the CHECK CRC signal 352 is activated to indicate that the CRC is to be checked. The "normal termination" state 377 is unconditionally exited after one duration of the PHY CLOCK signal 150, back to the "idle" state 371.

If the "violation" back at the "violation check" state 376 is found not to be a valid end delimiter, then other action is necessary. One possibility is that the "violation" is due to the reception of a second start delimiter. As previously discussed, a second subsequent start delimiter is an intentional abort request, and if that is found to be the case, a transition is made to an "abort" state 378. In the "abort" state, the HOLD STATUS signal 353 is set "false" to erase the previous status, and the ABORT signal 351 is activated to cause the RX ABORT signal 282 to be latched "true". The "abort" state 378 unconditionally exits after one PHY CLOCK cycle back to the "idle" state 371.

Another possible reason for a "violation" occurring at the "violation check" state 376 is that a Manchester error really did occur in the body of a MAC frame 21, i.e. not due to either a start or end delimiter 23 or 28. In that case, a transition is made to a "bad termination" state 379. In the "bad termination" state 379 state, the HOLD STATUS line 353 is again dropped to erase any previous status held by the status logic 350. The output BAD FRAME 281 is also activated, which serves as a direct output pulse indicating the bad termination condition. The "bad termination" state 379 also exits after one phy clock cycle back to the "idle" state 371.

Back in any of the states 372–374, not enough bytes have been received to constitute a complete MAC frame 21. However, it is still possible to invoke the abort sequence (i.e. a second start delimiter). If any violation is detected in any of the states 372–374, a "premature violation" state 380 is entered. If the "violation" turns out to be a second start delimiter, then the "abort" state 378 is entered as before. Likewise, if the "violation" was due to anything other than a second start delimiter, then the "bad termination" state 379 is evoked.

Finally, if the SHUTDOWN signal 369 is activated at any time, an immediate transition is made to the "bad termination" state 379. This clears any previous status, and resets the delimiter detect state machine 346 back to the "idle" state 371.

SMAC Access Control Circuit

The access control circuit 144 in the SMAC 100 shown in FIG. 5B includes a RISC 400 processor and other specialized support circuits for implementing the CTDMA protocol. As shown in detail in FIG. 10, the access control support circuits 401–407 include an event logic circuit 401, a "divide by ten" pulse generator 402, a MAC frame slot timer 403, a periodic interval timer 404, a guard time monitor 405, a scheduled phase register 406 and a decode circuit 407.

The RISC processor 400 is of conventional construction as is known to those skilled in the art. The RISC processor 400 includes internal random access memory (RAM) 410 and read only memory (ROM) 411, as well as other known circuits (not shown, e.g. registers, arithmetic/logic unit, program counter, op code decoder, etc.) for executing a program of instructions stored in the ROM 411. The RAM 410 contains a set of storage locations in which is stored the active network protocol parameters, as specified in the Lpacket that is broadcast by the moderator node during the guard band 56 of each periodic interval 50.

The RISC processor 400 implements a typical processor instruction set, including logical, arithmetic and data manipulation instructions. Several special purpose instructions are also implemented which utilize the address, data and control lines on the RISC bus 180 to perform the input and output operations to the other circuits connected to the RISC bus 180, as described in the relevant sections of this description. As previously stated, the internal bus used within the RISC processor 400 (i.e. the RISC bus 180) is extended externally via appropriate drivers and decoders (not shown) to allow the RISC processor access to remote inputs and outputs in other circuits of the SMAC 100 via execution of appropriate I/O instructions. A control program 412, stored in the ROM 411, is executed by the RISC processor 400 to implement the control functions of the access control circuit 144.

The instruction set for the RISC processor 400 includes a "wait" instruction. "Wait" instructions are known generally in the art for suspending processor activity pending activation of a hardware input signal indicating the end of the "wait" condition. The RISC processor 400 implements a specialized "wait" instruction utilizing the event logic circuit 401. When the RISC processor 400 goes into the "wait" state (i.e. upon execution of a "wait" instruction), the event logic circuit 401 decodes control and address lines on the RISC bus 180 to select one of several possible conditions indicated by input signals 408 as the "event" which will be used to trigger the end of the wait state and resumption of processing by the RISC processor 400. When the selected event condition becomes "true", an END WAIT signal 415 is activated by the event logic circuit 401. The END WAIT signal 415 is connected as an input to the RISC processor 400, and when activated, causes the RISC processor to resume processing at the instruction following the "wait" instruction.

The divide by ten pulse generator 402 receives the PHY CLOCK signal 150 as an input, and generates an output signal referred to as a MEGA PULSE signal 416. The MEGA PULSE signal 416 is connected to the event logic circuit 401, the slot timer 403 and the periodic interval timer 404 for those intervals of the MAC frame. As the name implies, the MEGA PULSE signal 416 hrs a one megahertz frequency, equal to the ten megahertz frequency of the PHY CLOCK input signal 150 divided by ten. The output pulse on the MEGA PULSE signal 416 has a duration equal to one cycle of the PHY CLOCK signal 150, i.e. the MEGA PULSE signal 416 is "true" for every tenth active period of the PHY CLOCK signal 150. The MEGA PULSE signal 416 therefore serves as a one microsecond time base for the connected circuits 401, 403 and 404.

The slot timer 403 generates a SLOT TIMEOUT signal 417, which is pulsed every time a slot timeout occurs. As previously discussed, a slot timeout occurs whenever a node 20 fails to transmit during its assigned slot. The amount of time that must elapse before a timeout occurs is sent to the SMAC, stored in RAM 410, and communicated to the slot timer 403 via the RISC bus 180. The RISC bus 180 is also used for communicating other status and control information between the RISC processor 400 and the slot timer 403. The slot timer 403 also receives the PHY CLOCK signal 150 as a basic operating clock, while the MEGA PULSE signal 416, as just mentioned, is used as a one microsecond time base. The SLOT TIMEOUT signal 417 is connected as one input to the event logic circuit 401 for use in determining some of the "wait" conditions.

Still referring to FIG. 10, the periodic interval timer 404 is used in conjunction with the RISC processor 400 to indicate the time that elapses during each periodic interval 50. Overall, the time expired in each periodic interval 50 is measured as a sixteen bit count (two bytes), referred to herein as a periodic., interval time (PIT) count. The PIT count has a resolution of ten microseconds per bit, which allows a maximum periodic interval of 655.35 milliseconds. The lower eight bit portion of the PIT count (least significant) is maintained within the periodic interval timer 404 itself, while the upper eight bit portion (most significant) is maintained by the RISC processor 400 in the RAM 410. At the beginning of a periodic interval 50, each portion is loaded with a value from RAM 410 that was received from the network moderator in the Lpacket sent during the guard band 56. The lower eight bit count, designated as bus PIT LO BYTE 418, is sent from the periodic interval timer 404 to the guard time monitor 405. Circuits are also provided within the periodic interval timer 404 to allow the value on the PIT LO BYTE bus 418 to be read directly by the RISC processor 400 via the RISC bus 180. The count on the PIT LO BYTE bus 418 is automatically decremented each ten microseconds until a count of zero is reached. A facility is provided within the periodic interval timer 404 to enable the RISC processor 400 to detect a zero count on the PIT LO BYTE bus 418 via the RISC bus 180. When that occurs, the RISC processor 400 decrements the value of the PIT high byte count (in RAM 410) by one. This process repeats until the PIT high order byte is decremented down to zero. At that time, the RISC processor 400 issues appropriate commands over the RISC bus 180 to activate a PIT HI BYTE ZERO signal 419 within the periodic interval timer 404. The PIT HI BYTE ZERO signal thereby indicates that the PIT high byte is now zero, and the only time remaining in the current periodic interval is the time represented by the low byte value on the PIT LO BYTE bus 418. The PIT HI BYTE ZERO signal 419 is also output to the guard time monitor 405.

One additional function of the periodic interval timer 404 is to produce a TONE COMMAND signal 420. The TONE COMMAND signal 420 is activated by the periodic interval timer 404 upon receipt of appropriate commands from the RISC processor 400 via the RISC bus 180. As discussed above with respect to FIG. 3, the "tone" 53 is the internal SMAC reference signal which marks the beginning of a new periodic interval 50, and occurs essentially at the same absolute, or "universal" time in all nodes 20 on the network 10, within a small margin of error due to propagation delays of time reference events. The TONE COMMAND signal 420 is used internally within the periodic interval timer 404 and also connected to the guard time monitor 405, the scheduled phase register 406, and the sync bus 176.

The guard band time monitor circuit 405 shown in FIGS. 10 and 11 determines the time at which the guard band portion 56 of each periodic interval begins. The start of the guard band is based on the PIT count presented on the PIT LO BYTE bus 418 and the PIT HI BYTE ZERO line 419. The "guard band time" value received from the network moderator is stored in a register 421 of the guard band time monitor circuit by the RISC processor 400 via the RISC bus 180. This value indicates the PIT count at which the guard band 56 is to start. In other words, the guard band 56 is considered to begin when the PIT count decrements to the "guard band time" value.

The "guard time" value is configurable, i.e. the guard time register 421 can be read from or written to by the RISC processor 400 via the RISC bus 180. A decode circuit 423 is connected to the RISC bus 180 to detect execution of a "write guard band time" command by RISC processor 400. When the "write guard band time" command is detected, the decode circuit 423 generates a strobe on line 424. The strobe 424 in turn causes the guard time register 421 to latch the data presented on the eight data lines of the RISC bus 180, represented by bus segment 425. Similarly, the RISC processor 400 is able to read back the contents of the guard band time register 421 via a byte select circuit 426. The byte select circuit 426 is connected between the "guard band time" bus 422 and the RISC bus 180, and decodes appropriate control signals on the RISC bus 180 to detect execution of a "read guard band time value" instruction by the RISC processor 400. When the "read guard band time value" instruction is detected, the "guard band time" value on bus 422 is coupled through to the data lines of RISC bus 180.

The "guard band time" value in register 421 and on bus 422 is one byte in length, and so the guard band 56 portion of the periodic interval 50 can only begin after the PIT HI BYTE ZERO signal 419 has been activated. To determine the start of the guard band, the eight bit value of the PIT LO BYTE 418 is compared to the "guard band time" value on bus 422 in comparator 427. An output 428 from comparator 427 is "true" when the respective inputs 418 and 422 are equal. The output 428 is connected as one input to an AND gate 429. The other input of AND gate 429 is connected to the PIT HI BYTE ZERO signal 419. Output 430 of AND gate 429 is therefore "true" when the conditions for starting the guard band are satisfied.

The guard band time monitor 405 produces three guard band control signals: a GENERAL GUARD BAND signal 431, a SCREENER GUARD BAND signal 432 and a MODERATOR GUARD BAND signal 433. Each of the signals 431–433 is activated during specific times in the guard band 56 portion of the periodic interval 50 to control different "guard band" activities. The GENERAL GUARD BAND and SCREENER GUARD BAND signals 431 and 432 are maintained by two flip flops 435 and 436, respectively. The flip flops 435 and 436 each have a synchronous "set" input connected to the output 430 of AND gate 429, and both flip flops 435 and 436 are clocked by the PHY CLOCK signal 150. As a result, the flip flops 435 and 436 are both set at the start of the guard band 56 of the periodic interval, activating the respective GENERAL GUARD BAND and SCREENER GUARD BAND signals 431 and 432.

Flip flop 435 is reset directly by the TONE COMMAND signal 420. The GENERAL GUARD BAND signal 431 is therefore "true" for the entire duration of the guard band 56, i.e. from the time that the PIT count reaches the "guard band time" value until the "tone" 53. The SCREENER GUARD BAND signal 432, however, is reset by an explicit command sent by the RISC processor 400. A decode circuit 437 is connected to the RISC bus 180, and detects the execution of a "reset screener guard band" instruction by the RISC processor 400. When the "reset screener guard band" instruction is detected, a strobe is produced on output line 438. Output line 438 is in turn connected to a reset input on flip flop 436, which when activated causes the flip flop 436 to reset on the next active edge of the PHY CLOCK signal 150. This allows the RISC processor 400 to deactivate the SCREENER GUARD BAND signal 432 at a time other than at the "tone" 53 for operation of the screening function as described below.

The third guard band control signal, namely the MODERATOR GUARD BAND signal 433, is connected as an output of an AND gate 440. One input of AND gate 440 is connected to the GENERAL GUARD BAND signal 431. The other input of AND gate 440 is connected to an output 441 of a flip flop 442. Flip flop 442 is under direct control of the RISC processor 400, and is used to store the "moderator" status for the node 20. If the RISC processor 400 has determined that its own node 20 is the moderator node for the network 10, then flip flop 442 is commanded to the "set" state. In that case, AND gate 440 is enabled, and the MODERATOR GUARD BAND signal 433 follows the GENERAL GUARD BAND signal 431 (i.e. the two are equivalent). Alternatively, if the RISC processor 400 determines that its own node is not the moderator node, then flip flop 442 is reset, and the MODERATOR GUARD BAND signal 433 is never activated.

Control of flip flop 442 is provided by a decode circuit 443. Decode circuit 443 is connected to the RISC bus 180, and decodes separate "set" and "reset" commands for the "moderator" status of the node 20. Upon detecting execution of either the "set" or "reset" commands, an output strobe is generated on one of two output lines 444 or 445, respectively. The output lines 444 and 445 are in turn connected to respective synchronous "set" and "reset" inputs on flip flop 442.

The guard band time monitor 405 also includes a bit test select circuit 446 to allow the RISC processor 400 to read the current states of both the GENERAL GUARD BAND signal 431 and the MODERATOR GUARD BAND signal 433. The bit test select circuit 446 is connected to the RISC bus 180, and includes decoding circuitry to detect execution of a "read" instruction by the RISC processor 400 which addresses the connected signals 431 and 432. When an appropriately addressed "read" instruction is detected, the selected signal 431 or 432 is coupled to one of the data lines on the RISC bus 180.

Referring for the moment to FIGS. 5B and 10, the guard band control signals 431–433 are routed as follows. The GENERAL GUARD BAND signal 431 and the SCREENER GUARD BAND signal 432 are connected into the sync bus 176. The MODERATOR GUARD BAND signal 433 connects within the access control circuit 144 to the event logic circuit 401, and is also routed out of the access control circuit 144 to the transmit processing circuit 141.

Now referring to FIGS. 10 and 12, the scheduled phase register circuit 406 of the access control 144 includes a flip flop 448, the output of which is termed a SCHEDULED PHASE signal 450. The SCHEDULED PHASE signal 450, when "true", indicates that the periodic interval 50 is currently in the scheduled phase 52. The flip flop 448 has synchronous set and reset inputs, and is clocked by the PHY CLOCK signal 150. The TONE COMMAND signal 420 is connected to the set input of flip flop 448. The SCHEDULED PHASE signal 450 is therefore automatically set "true" upon activation of the TONE COMMAND signal 420. This forces the scheduled phase to always begin at the "tone" 53, per the CTDMA protocol (see FIG. 3). The flip flop 448 is reset by an appropriate command from the RISC processor 400. Specifically, the scheduled phase register circuit 406 includes a decode circuit 451 connected to the RISC bus 180. The decode circuit 451 decodes appropriate address and control lines on the RISC bus 180 to detect execution of a "reset scheduled phase" output instruction by the RISC processor 400. When the "reset scheduled phase" instruction is detected, an output line 452 connected to the reset input of the flip flop 448 is activated, resetting flip flop 448. Once flip flop 448 is reset (SCHEDULED PHASE signal 450 "false"), the periodic interval 50 is considered to be in the "unscheduled" phase 54 up until the start of the "guard band" as defined above. The SCHEDULED PHASE signal 450 also stays "false" throughout the guard band 56 until again set "true" by the next activation of the TONE COMMAND signal 420.

The RISC bus 180 is also connected to a bit test select circuit 453 to allow the RISC processor 400 to read the current value of the SCHEDULED PHASE signal 450. The bit test select circuit 453 includes decoding circuitry for responding to execution of a "read scheduled phase bit" instruction by the RISC processor 400. When the "read scheduled phase bit" instruction is detected, the bit test select circuit 453 couples the value of the SCHEDULED PHASE signal onto the RISC bus 180 for input by the RISC processor 400.

Referring to FIG. 13, a detailed description of the periodic interval timer circuit 404 in the access control 144 is now presented. The PIT LO BYTE bus 418 is connected as the parallel output of a down counter 500. A byte select circuit 501 is connected between the PIT LO BYTE bus 418 and the RISC bus 180 to permit the RISC processor 400 to directly read the current contents of the PIT LO BYTE bus by execution of an appropriate "read byte" instruction. The down counter 500 is synchronously docked by the PHY CLOCK signal 150, and has separate "enable parallel load" and "enable count" inputs to control respective parallel load and count operations. The "enable count" input is connected to an output 502 from a "divide by ten" prescale circuit 503, that is clocked by the PHY CLOCK signal 150 and receives the MEGA PULSE signal 416 as an "enable" input. For every tenth activation of the MEGA PULSE signal 416, the prescale circuit 503 produces a pulse on output Line 502. The down counter 500 is thereby enabled to count down once each ten microseconds. In other words, each of the down counter 500 is a ten microsecond increment.

The down counter 500 can also be loaded in parallel under control of the RISC processor 400 with the PIT value received by the SMAC 100 in the moderator Lpacket. A decode circuit 504 is connected to the RISC bus 180 and detects execution of a "write periodic interval time" (write PIT) instruction. When the write PIT instruction is detected, an output line 505 is activated. Output line 505 connects to both the "enable parallel load" input of down counter 500 and to a reset input of the prescale circuit 503. Activation of output line 505 causes the down counter 500 to load the parallel data from the data lines of the RISC bus 180, represented by bus segment 506. At the same time, activation of the reset input on the prescale circuit 503 forces the prescale operation to restart at a full count of ten. This insures a complete ten microsecond period before activation of the prescale circuit output 502 after loading the down counter 500, regardless of any residual count which might have remained in the prescale circuit 503.

In addition to the PIT LO BYTE bus 418, the down counter 500 also outputs a PIT COUNT ZERO signal 507. The down counter 500 is constructed to automatically wrap from a count of zero to the maximum eight bit count (hexadecimal "FF"). The PIT COUNT ZERO signal 507 is activated whenever the count contained in down counter 500 is equal to zero, i.e. such that the next activation of the PHY CLOCK signal 150 will cause the wrap to occur. In that sense, the PIT COUNT ZERO signal 507 indicates that the next count will produce a carry from the PIT low byte count in the down counter 500. The PIT COUNT ZERO signal 507 is connected as an input to a two-stage PIT carry shift register 510, which latches this "carry" indication from the down counter in a two stage fashion so that the RISC processor 400 has time to process each "carry". The PIT carry shift register circuit 510 is clocked by the PHY CLOCK signal.

Referring still to FIG. 13, the TONE COMMAND signal 420 is produced by a decode circuit 525 connected to the RISC bus 180. This circuit 525 decodes execution of a "generate tone" instruction by the RISC processor 400 and emits the TONE COMMAND signal 420 when the "generate tone" instruction is detected. The PIT HI BYTE ZERO signal 419 is maintained by a PIT hi byte zero flip flop 530, that is clocked by the PHY CLOCK signal 150. The flip flop 530 can be set under control of the RISC processor 400. As previously stated, the RISC processor maintains the PIT high order byte internally, i.e. in RAM 410. The RISC processor 400 also takes care of decrementing the PIT high order byte each time the down counter 500 produces a "carry". Each time the RISC processor 400 decrements the PIT high order byte, the result of the decrement operation (i.e. the "zero" or "non-zero" status of the result) is written to the PIT hi byte zero flip flop circuit 530 via a "write PIT hi byte result" instruction on the RISC bus 180. When the TONE COMMAND signal 420 becomes "true", flip flop 530 and the corresponding PIT HI BYTE ZERO signal 419 are forced to a reset condition.

MAC Transmit Processor

The access control circuit 144 shown in FIG. 5B also controls the transmit processing circuit 141 within the SMAC 100. The transmit processing circuit 141 selects data from one of the transmit first in, first out memories (TX A, TX B and TX C) within the host interface 143 and properly formats the data for transmission by the modem 140. The details of the transmit processing circuit 141 are shown in FIG. 14 and the transmit first in, first out memories will hereinafter be referred to as "transmit FIFO's." A transmit mover 600 automatically processes sixteen-bit words from the transmit FIFO's by separating them into eight-bit bytes. The separated data bytes then are presented via the TX BYTE bus 602 to a transmit assembler 604. The transmit mover 600 responds to control signals received from the host interface 143 via the TX STREAM STATUS bus 185 which indicate which one of the three transmit FIFO's has been marked as "ready" for transmission. When it is time for the node 20 to transmit over the network, the access control circuit 144 issues appropriate instructions over RISC bus 180 which instruct the transmit processing circuit 141 to commence transmitting. At the same time, a signal is received by the transmit mover 600 via the RISC bus 180 designating one of the "ready" FIFO's in the host interface 143. The transmit mover 600 sends the identification of the selected transmit FIFO to the host interface via the SELECT TX STREAM bus 186.

The host interface circuit 143 responds by sequentially placing each sixteen bit word of data from that FIFO onto the TX WORD bus 187, which is connected as an input to the transmit mover 600. Each data word received from the host interface 143 is latched in a register within the transmit mover 600 and then separated into two bytes. The two bytes are sequentially applied to the TX BYTE bus 602 and sent to the transmit assembler 604.

The transmit assembler 604 converts the byte of data into the Manchester encoded serial format and also responds to control signals via the RISC bus 180 by generating the Manchester phy symbols for the preamble and delimiters of the outgoing MAC frame 21. The generated TX PHY SYMBOLS signal 269 is applied to a line of output bus 161 connected to the transmit input of the modem 140. The END BLANKING signal 257, TX ENABLE signal 256 and TX RESERVE signal 271, described previously with respect to the modem 140, are also produced by the transmit assembler 604 and applied to the output bus 161.

The RISC bus 180 is also connected directly to the transmit assembler 604 in order for the RISC processor 400 to send data over the network. For example, the RISC processor 400 in the moderator node uses this data path to transmit MAC frames during the guard band 56 which contains an Lpacket of station management information as previously described. When the MODERATOR GUARD BAND signal 433 is active, data from the RISC bus 180 is converted into a Manchester formatted serial signal by the transmit assembler 604 and sent to the modem 140 via bus 161.

While the transmit mover 600 is actively handling data, it generates an active TX BUSY signal 182 to provide an indication to the access control 144 that transmission is in progress. A TX ERROR signal 606 also is generated by the transmit mover 600 as an indication that a transmission underflow has occurred. The transmit FIFO's within the host interface 143 are only thirty-two bytes long. Since the data for most messages will be much longer, the host interface relies on the host processor 102 to keep the FIFO's from running out of data before the message frame is formed. However, if the host processor does not supply data fast enough, a data underflow occurs. The transmit mover 600 detects that event and sends a TX ERROR signal 606 to a set of transmit status registers 608. This error indication can be read from the transmit status registers 608 by the RISC processor 400 via bus 180.

The RISC processor 400 also stores control information within the transmit status registers 608. One such control bit designated TX REQUEST 612 is used to initiate the message transmission process. When an error condition occurs, the RISC processor 400 may respond by storing a TX ABORT bit 610 within the transmit status register 608 to terminate any transmission in progress.

A frame word countdown counter 614 within the transmit processing circuit 141 maintains a count of the number of data words available within the data field 25 of the current MAC frame 21. As each word of data is transmitted by the circuit 141, the count within the frame word countdown counter 614 is decremented. This count is periodically read by the RISC processor 400 to determine whether another data Lpacket from the host interface 142 can be sent within the current MAC frame 21, or whether the CRC 27 and end delimiter 28 should be sent.

This transmit processing circuit 141 takes care of message data being sent by the node and a different circuit processes the messages received from the network.

SMAC Receive Processor

The SMAC 100 shown in FIG. 5B utilizes a receive processing circuit 142 to handle incoming data from the modem 140 and format it for the host interface 143. The details of the receive processing circuit 142 are shown in FIG. 15. The incoming PHY DATA signal 270 carried by the input bus 162 is received by a data and control pipeline 800 within the receive processing circuit 142. The pipeline 800 is coupled to the data clock bus and receives the BYTE CLOCK signal 262, the BYTE PULSE 151 and the BIT CLOCK signal 261 produced by the modem.

The details of the data and control pipeline 800 are shown in FIG. 16. The PHY DATA signal 270 is received in a serial in/parallel out shift register 801 which is clocked by the BIT CLOCK signal 261. Shift register 801 converts the serial PHY DATA signal 270 into a PARALLEL RX DATA signal 802. The PARALLEL RX DATA signal 802 is applied as an input to an Lpacket byte counter 803 and to a three stage pipeline register 804.

The data and control pipeline 800 "tracks" the progression of an incoming MAC frame 21 as it is being received. The frame starts with an activation of the RX READY signal 166 by the modem 140. Thereafter, each Lpacket is tracked by latching the size field of the Lpacket into the Lpacket byte counter 803 in response to the ENABLE SIZE LOAD signal from a pipeline control state machine 806. The pipeline control state machine 806 receives the RX READY signal 166, the BIT CLOCK signal 261, and the BYTE PULSE signal 151 from the modem 140. The pipeline control state machine 806 utilizes these input signals to time the occurrence of various fields within the incoming PHY DATA signal 270 and issue the appropriate control signals to the Lpacket byte counter 803 and the pipeline registers 804. The Lpacket byte counter 803 provides a signal 807 which indicates to the pipeline control state machine 806 when the count of incoming bytes of the PHY DATA signal 207 indicates that an Lpacket has been completely received. This Lpacket completion signal 807 causes the pipeline control state machine 806 to issue the corresponding END LPACKET signal to the pipeline register 804.

Referring to FIGS. 15 and 16, the pipeline register 804 is a three stage shift register which processes the incoming data and control signals in parallel, shifting the data through each of the stages in response to the BYTE CLOCK signal 262. As the incoming data is shifted through the register 804, the contents of each stage is available to other components of the SMAC system. The output of the first stage of the pipeline register 804 is connected by a set of data gates to the RISC bus 180 for reading by the RISC processor 400. The output of the second stage of the pipeline register, designated Level "B" is applied via bus 808 to a first data input of a receive screening circuit 810. The Level "B" bus 808 also carries the END LPACKET signal which has been clocked through the first two stages of the pipeline register, and signals derived by individually ANDing the RX READY signal with the START FRAME signal and the START LPACKET signal which have been clocked through the first two stages of the pipeline register 804. These three Level "B" control signals also are clocked through the third stage of the pipeline register 804 along with the TX BUSY signal 182 from the second stage. The END FRAME signal from the pipeline control state machine 806 is applied directly to an input of the third stage of the pipeline registers 804. The contents of the third stage of the pipeline register 804 are applied to a Level "C" bus 809 which is connected to a second input of the receive screening circuit 810 and to an input of the RX router circuit 812. The pipeline register 804 enables the RISC processor 400 to receive the incoming data via the RISC bus 180 prior to the data being available at the inputs of the receive screening circuit 810 and the RX router 812. This provides a one-byte head start to the operation of the RISC processor with respect to the operation of these latter two components 810 and 812.

With reference to FIG. 15, the RX router 812 in the receive processing circuit 142 is responsible for feeding the incoming data and pertinent control signals into the receive first in, first out memories of the host interface 143 (see FIG. 5B). The receive first in, first out memories will hereinafter be referred to as "receive FIFO's." The received data is sent from the RX router 812 to the host interface 143 via the RX byte output bus 170 along with the control signals via the RX FIFO control bus 171.

Although the RX router 812 processes all of the incoming Lpackets received by the SMAC 100 from the network 10, control signals received from the receive screening circuit 810 via connection 813 enable the selection of only the Lpackets of interest to the host processor 102 (FIG. 5A). The acceptance of Lpackets is controlled by three sources: a general purpose screener, a fixed screener and an external screener. The general purpose screener is implemented almost exclusively by circuitry in the receive screening circuit 810 with minimal involvement of the RISC processor 400. For this purpose the receive screening circuit 810 maintains a table of Lpacket tags to accept. The fixed screener is used to identify specific Lpackets, such as the moderator Lpacket, which contain network or station management information. To a great extent, the fixed screening is performed by the RISC processor 400 in response to data and control signals supplied by the receive screening circuit 810, and the external screening is performed off of the SMAC 100. Although the fixed screener is preprogrammed with tags of interest, the tags for which the general purpose and external screeners search are defined by the user.

As an Lpacket is being received, a screener coordinator within the receive screening circuit 810 waits for an answer from the three screening sources and responds by making a decision whether to accept that Lpacket. An ACCEPT LPACKET signal is applied by the screener coordinator via bus 813 to the RX router 812, if the Lpacket is of interest to the host processor 102. The receive screening circuit 810 also analyzes the incoming data and control signals to generate either a SELECT MAIN and SELECT AUX signals. These latter signals are conveyed by the RX router to the host interface 143 to select which receive FIFO (RX MAIN or RX AUX) in the host interface will receive the data. At the start of each Lpacket, both the SELECT MAIN and the SELECT AUX signals are active and both receive FIFO's begin to store the Lpacket data until one of the screeners accepts the Lpacket. When a decision is made as to which receive FIFO will keep the data, the other receive FIFO is deactivated by a signal on the RX FIFO control bus 171. If the Lpacket ends without being accepted, a default NO ACCEPTANCE signal is sent to the host interface 143, which responds by discarding the FIFO contents. In this manner, the receive screening circuit 810 selects those Lpackets containing tags which the screeners have been programmed to recognize.

SMAC Host Interface

With reference to FIG. 17, the SMAC host interface 143 couples the transmit and receive processing circuits 141 and 142 to the external host processor 102 and handles the exchange of data therebetween.

The operation of the host interface 143 utilizes data stored in a set of status and control registers 868 formed in part of a random access memory 844. FIG. 18 shows the assignment of each word-sized storage location in these registers 868. The first storage location 880 contains bits which indicate the general operational status of the SMAC 100. Each of the three transmit data streams TX A, TX B, and TX C has a group of storage locations 882, 883 and 884, respectively, configuring its operation. These storage locations include a control word which defines whether the stream holds a normal or an SMAC configuration Lpacket, whether the stream data is for the scheduled or unscheduled phase, and whether direct memory access is available to the host processor memory. Another storage location for each transmit data stream has a status byte that indicates whether the stream is available and if so whether it is full. The other byte of this latter storage location holds flags signalling different error conditions for the transmit data stream. There also are three registers in each group 882–884 for the transmit data streams which hold a pair of pointers to the first and last data items in the associated transmit stream and a third pointer indicates how much of the data has been released for transmission, as will be described.

A group of storage locations 885 or 886 in the status and control registers 868 is assigned to each of the receive data streams (main RX stream and AUX RX stream). Each of these groups contains a byte of data indicating the status of the receive stream and a byte instructing the SMAC whether direct memory access to the host processor is available. Another byte in the receive stream registers contains error flags associated with the stream's operation. A pair of registers for each receiver stream hold pointers to the first and last words of data in that stream.

Additional control registers are provided to act as interrupts to the host processor 102. The first of these interrupt registers 888 holds bits indicating whether any one of the other interrupt registers has any bit set. Separate interrupt registers 890 and 891 are provided for the transmit and receive data streams and another register 894 holds bits for miscellaneous interrupts. A group of registers, designated, PSYNC interrupt 892, are employed to configure the SMAC to detect when a periodic interval having a defined numerical count occurs on the network. The periodic interval count is stored in another register 895. The use of these latter registers 892 and 895 will be described in detail. A final register 894 is used to configure the general purpose screener.

Referring again to FIG. 17, when data is received by the SMAC 100 from the network 10, the receive processing circuit 142 sends the previously described control signals over the RX FIFO control bus 171. The RX FIFO control bus 171 is connected to a distributor and control circuit 860 that also gets the received data via the RX BYTE bus 170. The distributor and control circuit 860 responds to the incoming signals by enabling both of the receive FIFO's (MAIN and AUX) 863 and 864 via control signals sent over a FIFO bus 862. Each of the words of the incoming Lpacket is stored in both of the word-wide receive FIFO's 863 and 864 at this time. The receive FIFO's 863 and 864 are implemented in the RAM 844 using conventional techniques, by setting aside a group of storage locations within RAM 844 for each FIFO.

Thereafter, the distributor and control circuit 860 receives a signal on the RX FIFO control bus 171 when a screener has determined that the Lpacket is of interest to this node 20. In that event, the screener signal will indicate which of the two receive FIFO's 863 or 864 is to retain the data and the distributor and control circuit 860 responds by resetting the end of data address pointer for the non-selected receive FIFO to the beginning of the data, which action discards its data. The distributor and control circuit 860 also responds by enabling an interrupt generator 866 that sends an interrupt signal over the host bus 101 indicating to the host processor 102 that interesting data has been received and indicating which of the two receive FIFO's 863 or 864 contains the data. The host processor 102 responds to the interrupt signal by obtaining the data from the specified receive FIFO 863 or 864. As previously described, the first word of each Lpacket specifies the number of words in the Lpacket. This length is used by the host processor in determining how many words to read from the receive FIFO. A pair of cache memories 871 and 872 interface the receive FIFO's to the host bus 101 enabling data to be retrieved from a FIFO while additional received data is being stored by the distributor and control circuit 860.

On the other hand, if none of the screeners indicates that the recently received Lpacket is of interest, the distributor and control circuit 860 resets the end of data address pointers for both receive FIFO's 863 and 864 to coincide with their beginning data location, which action effectively flushes the previously received data from both the FIFO's.

The host interface 143 is configured to access the outgoing data stored in the host processor memory either by a direct memory access (DMA) controller in the host processor 102 or by requiring that the host processor supply the data as the transmit FIFO's empty. In order to transmit data over the network, the host interface 143 receives data address and control signals from the host processor 102 via host bus 101, which is coupled to the buffered host bus 174 by a set of tri-state data gates 870. Prior to sending message data to the host interface 143, the host processor 102 stores information within the status and control registers 868 to configure the characteristics of each of the three transmit data streams stored in FIFO's TX A, TX B or TX C. One characteristic is whether a stream is to contain data for transmission during the scheduled phase 52 or the unscheduled phase 54.

Outgoing Lpackets are carried over the host bus 101 through a transmit cache memory 845 to decode circuitry 840, which responds to the control information in registers 868 by routing the data to the designated transmit FIFO (TX A, TX B or TX C). The trio of transmit FIFO's 841–843 is implemented in the random access memory 844 in a similar manner as the receive FIFO's 863 and 864. Specifically, a group of sixteen word-wide storage locations is set aside within the RAM 844 for each FIFO. Three of the status and control registers 868 are assigned to hold address pointers for each transmit FIFO. A read address pointer indicates the first word of data that is to be read from the FIFO. A write address pointer designates the location of the last word in the FIFO and thus the next location into which a new word can be loaded. The third address pointer is designated as the release pointer and indicates how much data beginning at the read address pointer has been released for transmission by the host processor 102, as will be described.

When the decode circuitry 840 has an Lpacket to place in a transmit FIFO 841–843, the circuitry reads information stored in another control register 868 that indicates in which transmit FIFO 841–843 to place the data. This information is derived from the address written to by the host processor and tracks along with the data. Once the transmit FIFO is known, the decode circuitry 840 obtains the write address pointer for that FIFO, loads a data word into the next FIFO storage location, and increments the write address pointer. The process is repeated for each word of data for an outgoing Lpacket.

The output of each transmit FIFO 841–843 is connected via bus 850 to a transmit control circuit 854 that responds to commands from the RISC processor 400. The RISC processor 400 periodically queries the transmit control circuit 854 via the RISC bus 180 to determine whether there is data in any of the transmit FIFO's that is ready to be sent over the network.

An Lpacket stored in a transmit FIFO 841–843 is not able to be transmitted until it is released by the host processor 102. This is accomplished by the host processor setting the release address pointer to the last data item that is ready for transmission. The release of data may occur immediately when the last word of a message has been placed into the FIFO, at a particular time, or upon the occurrence of an event sensed by the host processor. Any data in storage locations between the read address pointer at the beginning of the transmit FIFO and the release address pointer is available for transmission, while any data on the other side of the release address pointer is to be held in the FIFO. The TX control circuit 854 reads these address pointers in response to an inquiry from the RISC processor 400 to determine whether a given transmit FIFO has data that is ready. If so, the RISC processor 400 is notified and a signal is applied to the TX stream status lines 185. The RISC processor 400 is also able to obtain the first data word of the Lpacket at the beginning of the transmit FIFO. That word contains the length of the Lpacket in terms of a number of data words.

When it is the node's turn to send data of the type, scheduled or unscheduled, in a transmit FIFO, the transmit mover 600 (FIG. 14) is enabled by the RISC processor 400 which informs the transmit mover 600 how many words are in the first Lpacket to be sent. The transmit mover 600 responds by signalling the transmit control circuit 854 in the host interface 143 which begins transferring words from the appropriate FIFO 841–843 to the transmit mover 600. Each time a word is read from the FIFO the read address pointer for that FIFO is incremented to the next word of data. When the entire Lpacket has been read from the FIFO, the RISC processor 400 determines whether enough space remains in the outgoing MAC frame to send another Lpacket. If so, the RISC processor 400 issues inquiries of the transmit control circuit 854 whether additional Lpackets are ready in the same transmit FIFO. If there are, the process repeats until the release address pointer indicates that more data is not available.

Typically an Lpacket of data is completely loaded into a transmit FIFO before the host processor 102 moves the release address pointer to the last word of the Lpacket. In this manner, an earlier Lpacket can be marked as ready for transmission while another Lpacket is being loaded and the host processor does not have to know the transmission status of the earlier Lpacket. In fact the earlier Lpacket may be in the process of being sent to the transmit mover 600 while the host processor 102 is loading another Lpacket into the transmit FIFO.

The transmit FIFO's are 32 bytes long. When a transmit FIFO fills with unreleased data, an automatic release occurs without any action on the part of the host processor 102. This occurs when the write address pointer wraps around and bumps into the read address pointer at a time when no data has been released, i.e. the release address pointer points to the same location as the read address pointer. Since the FIFO is filled and the data could not otherwise be removed from the FIFO, the data is automatically released for transmission.

Another method of coordinating the transmission of data utilizes the count of periodic intervals which occur on the network 10. This count is stored in section 895 of the host interface status and control register 868 (FIG. 18) and is incremented by the RISC processor 400 immediately before the tone signal is produced within the SMAC 100. As noted previously, the moderator Lpacket sent during the guard band 56 contains the count of the periodic intervals and a modulus used in the counting. The RISC processor 400 receives the moderator Lpacket from the receive processing circuit 142 via the RISC bus 180 (see FIG. 5B). The periodic interval count from the moderator Lpacket at the end of the periodic interval is stored in the status and control register 868 replacing the count produced by the RISC processor 400. This technique ensures that the periodic interval count will be the same in all nodes on the network. However, in the event that a given node fails to receive one or more moderator Lpackets, the periodic interval count will be maintained by its RISC processor incrementing the periodic interval count 895 in the status and control registers 868 based on timing from the SMAC internal clock circuits.

Referring still to FIG. 17, one or more Lpackets in a transmit FIFO 841–843 can be designated for transmission during a periodic interval having a specified count. This technique can be employed to synchronize the transmission of data from several nodes so that all the data is sent during the same periodic interval, or to send less critical data less frequently than every periodic interval to reduce the message load on the network. The technique also is used to provide all of the data required for a given computation in a timely manner. To use this data transmission mechanism, the host processor 102 forms a two byte pseudo Lpacket, referred to as a Start Of PIT (SOP). The first byte denoting the size of the Lpacket is set to 00H, which is an illegal size for a legitimate Lpacket. The second byte contains the periodic interval count during which the data should be sent. The SOP is loaded into the appropriate transmit FIFO 841, 842 or 843 followed by one or more Lpackets containing the data to be transmitted. Typically the Lpackets will be followed by another two byte pseudo Lpacket, referred to as an End Of PIT (EOP). The first byte of the EOP is set to 01H, which also is an illegal size for a legitimate Lpacket. The second byte of the EOP is ignored and may have any value. Since both the SOP and the EOP have illegal size designations, they will be easily distinguished from the normal Lpackets in the transmit FIFO 841, 842 or 843.

The section of the transmit FIFO in which the SOP has been placed is controlled by the release address pointer just as for other types of Lpacket data. During each periodic interval, the RISC processor 400 interrogates the host interface 143 to determine whether any of the FIFO's 841–843 have data that has been released. Assuming that the data stream has been released, the RISC processor 400 will read the SOP when it has worked its way to the front of the FIFO. When the SOP is read at this time, the read address pointer for that FIFO is not changed so that the SOP remains at the front of the FIFO. The RISC processor 400 recognizes that an Lpacket with a size of 00H is an SOP and responds by reading the periodic interval count from section 895 of the status and control registers 868 in the host interface 143. The second byte of the SOP is compared by the RISC processor 400 to the periodic interval count to determine if the subsequent Lpackets in the transmit FIFO should be sent at this time. A mask can be employed by the RISC processor to select which bits of the periodic interval count to use in determining whether to send the Lpackets stored behind the SOP. The host processor can define the mask so that all bits of the periodic interval count must match the count value in the SOP, or define the mask so that transmission will occur on the next transition of one of the count bits. The mask for the SOP is sent to the RISC processor in an SMAC configuration Lpacket. In determining whether the Lpackets should be sent, the RISC processor 400 exclusive OR's the periodic interval count with the SOP count value, and logically AND's the result with the mask. This logical operation is repeated during each periodic interval.

When the end result of the logical operation is a byte of all zero bits, the RISC processor 400 sets the read address pointer to the next word of data in the transmit FIFO following the SOP. This configures the transmit FIFO so that the subsequent Lpackets will be sent when the next opportunity arises to send that type, scheduled or unscheduled, of data. When that opportunity arises, the RISC processor 400 reads the length of the Lpacket following the SOP and signals the transmit mover 600 (FIG. 16) to transmit that number of words from the associated FIFO. Each time the transmit mover 600 sends a word from the FIFO the read address pointer is incremented by the TX control circuit 854 to the next FIFO word.

After the specified number of words has been transmitted, the transmit mover 600 stops and signals the RISC processor 400. If another Lpacket remains in the FIFO the RISC processor 400 reads the first word and signals the transmit mover 600 to send the number of words in the next Lpacket. The transmission stops when an EOP pseudo Lpacket is found at the front of the FIFO, i.e. the location indicated by the read address pointer.

When a tone signal is issued in the SMAC for the next periodic interval, the TX control circuit 854 increments the read address pointer to effectively discard the EOP so that it will not be sent over the network. Thus any other released Lpackets in the FIFO after the SOP data sequence will be transmitted during another periodic interval when the node is afforded an opportunity to transmit that type of data. However, if another transmit FIFO 841–843 has an Lpacket that can be sent during the same MAC frame as the SOP data sequence and enough time remains, that Lpacket will be sent over the network.

Placing an EOP in the transmit FIFO 841–843 is not required in some instances. For example, when the data from one SOP is followed by another SOP, an EOP is not required as the second SOP marks the end of the Lpackets for the previous SOP and will halt transmission. In addition, by inserting an EOP into a stream of released Lpackets in a transmit FIFO 841–843, the transmission can be suspended at that point until the next periodic interval in which the node is afforded an opportunity to transmit that type of data. A series of consecutive EOP's can be placed in the FIFO to delay the transmission by an equivalent number of periodic intervals.

The periodic interval count can also be used in other ways to coordinate the time at which one or more host processors 102 on the network 10 perform specified functions. As described previously, the RISC processor 400 maintains a count, in host interface status and control register 895, of the periodic intervals that occur on the network 10. The SMAC 100 can be configured by the host processor 102 to generate an interrupt signal when the periodic interval count reaches a defined value. Section 892 of the status and control registers 868 contains the numerical value of the periodic interval count at which to generate the interrupt and a number mask to be used during count comparison, as will be described. A status register in section 892 designates whether the interrupt will be generated at the tone signal, at the end of this node's slot in the scheduled phase, at the end of the scheduled phase or at the beginning of the guard band of the designated periodic interval. Typically the tone signal is used for event coordination.

For example, the host processor may store the interrupt configuration data into these interrupt registers in response to receiving a message from another station instructing the host processor 102 to perform a given operation when the periodic interval count reaches a value that is specified in the message. The numerical periodic interval count value from the message is loaded into the PSYNC interrupt section 892. Similar messages may be sent to other nodes so that the operation of several host processors can be synchronized. However, the use of the periodic interval count to trigger a specific action by the host processor does not require a message be received from the network. Alternatively, a program in the host processor 102 can configure the interrupt registers 892 for a specific periodic interval count and commence an operation when the SMAC 100 issues the PSYNC interrupt signal that indicates the occurrence of that periodic interval interval.

When the PSYNC interrupt is configured, the RISC processor 400 reads the count value and the mask from the interrupt registers 892 each time the periodic interval count is incremented. The RISC processor 400 exclusive OR's the periodic interval count with the interrupt register count value, and logically AND's the result with the mask. When the end result of these logical operations is a byte of all zero bits, the designated periodic interval has occurred. In response, the status interrupt register in section 892 is read and its contents are used by the RISC processor to determine when during the periodic interval to generate the PSYNC interrupt signal to the host processor 102. The PSYNC interrupt signal is produced by storing an appropriate logic level bit in the system level interrupt register 888, which then will be read by the host processor 102.

Another use of the periodic interval count involves synchronizing the internal clocks 99 within each host processor. Conventional host processors, such as programmable controllers, have an internal clock 99 (FIG. 5A) by which events controlled by the processors can be timed. In addition, programs executed by the host processor can utilize the internal clock 99 to determine when to perform certain operations. For example, at the end of a work shift in the factory, the host processor may execute a program that prepares a report of that shift's production.

Although the internal clock 99 is incremented by a signal from a crystal controlled oscillator to provide a relatively high degree of accuracy, eventually even the most accurate clocks will drift from the true time. When activity in a factory is being coordinated by many host processors 12–16 linked together by the network 10 as depicted in FIG. 1, the drift of the individual host processor clocks can adversely affect that coordination. As a result, the present network 10 provides a mechanism by which the internal clocks in all of the host processors can be synchronized periodically. In order to precisely synchronize the internal clock 99, each station has to be informed that a synchronizing signal will be coming so that prompt action will be taken when signal is received.

To implement this concept, an operator of the factory designates one of the host processors as having the master clock for the network. This host processor is referred to as the "master host processor". Such designation can be accomplished by an operator entering the appropriate command into a terminal which is connected to the master host processor, for example. In a similar manner, the operator may manually adjust the master clock to compensate for its drift with respect to the true time. Periodically, the master host processor broadcasts a time coordination message over the network to synchronize the clocks in all of the host processors to the master clock. The period between these broadcasts is determined by the rate at which the host processor clocks 99 drift and the amount of that drift which can be tolerated.

The time coordination message is an Lpacket that is transmitted during the unscheduled phase 54 of a periodic interval 50 and that has a fixed tag which indicates the character of the data. The link data field of this Lpacket specifies an upcoming periodic interval count value and the future time value that the master clock will have at the tone of the periodic interval having the specified count. In formulating this Lpacket data, the master host processor 102 uses the present time of its clock 99 to calculate what the time will be a given number of periodic intervals from when the tone signal for the present periodic interval occurred. This becomes the future time value for the time coordination message. The given number of periodic intervals is selected to be sufficiently large so that every station on the network will have received and processed the message so as to be in a state to adjust its clock 99 at the proper time. The given number of periodic intervals is added to the count of the present periodic interval to derive the periodic interval count for the time coordination message.

Upon receiving the time coordination message the SMAC 100 forwards the time data Lpacket to the associated host processor 102 where the future time value and an upcoming periodic interval count value are stored. The receipt of this Lpacket causes the host processor to begin executing a routine depicted in FIG. 19 for adjusting its clock 99. At step 900 of the routine, the host processor 102 configures the SMAC 100 to generate a PSYNC interrupt during a tone signal when the periodic interval count equals the count value in the time coordination message. This configuration is the same as described above. The routine execution than waits at step 902 for the PSYNC interrupt signal from the SMAC.

Upon receiving the PSYNC interrupt signal, the host processor 102 immediately reads its own internal clock 99 at step 904. At step 906, the host processor 102 calculates the difference between its internal clock time and the future time value that was received in the time coordination Lpacket. If the internal clock 99 is synchronized with the master clock in the master host processor, the two time values will be the same, a difference of zero, and the program execution ends by bunching from step 908. Otherwise the program advances to step 910 where the sign of the difference is used to determine whether the host processor's clock 99 is slow or fast with respect to the master clock.

The host processor 102 uses the difference to adjust its internal clock 99 to become synchronized with the master clock. Because the time signal provided by the clock can be used for many control purposes, the time signal must always be montonic and increasing. Thus in adjusting the clock, time values can not be skipped and can never go backwards. In adjusting the dock, the host processor 102 varies the frequency of a crystal controlled oscillator that provides a reference signal to the dock. This is accomplished by an adjustable frequency divider that divides the oscillator frequency by a factor set by the host processor to provide the clocks reference signal. If the clock is running fast, the oscillator is slowed slightly so that the clock value and the time signal increases at a slower rate at step 912. Similarly, if the dock is running slow, the oscillator is sped up slightly so that the clock value and the time signal increases at a faster rate at step 914.

The invention being claimed is:

1. A communication network comprising:

a medium through which messages can be transmitted by a plurality of stations during each one of a plurality of periodic intervals, in which the periodic intervals are numbered consecutively according to a predetermined modulus, and in which each periodic interval has a fixed, predetermined duration and includes a set of time slots during which stations are afforded an opportunity to transmit, wherein each time slot is identified by an associated slot number, with the slot number being included in the transmission made during each time slot to thereby identify the current time slot;

a first station which is connected to said medium, and which at a fixed, predetermined point during each periodic interval, transmits through said medium a moderator message which includes a periodic interval number in addition to the slot number, in which the periodic interval number represents a current value for the consecutive numbering of the periodic intervals; and a second station including a receiver coupled to said medium to receive transmissions made by other stations, the second station including:

a memory for storing a predefined value corresponding to one or more periodic interval numbers of interest;

a comparator connected to the receiver and the memory for comparing the periodic interval number from a received moderator message to the predefined value; and means connected to the comparator for performing a defined operation when the periodic interval number from a received moderator message equals the predefined value.

2. The communication network as recited in claim 1 wherein said second station receives from the medium a control message containing the predefined value; and said second station further includes a means for loading the predefined value from the control message into the memory.

3. The communication network as recited in claim 2 wherein the control message also contains a future time value; said second station further includes a clock which provides a numerical time signal; and wherein the means for performing a defined operation alters the clock if the numerical time signal does not substantially equal the future time value at a fixed point in time after the comparator indicates receipt of a moderator message in which the periodic interval number equals the predetermined value.

4. The communication network as recited in claim 1 wherein said second station further includes a transmitter connected to send messages through said medium; and wherein the means for performing a defined operation enables said transmitter to transmit a message when both (a) the current time slot is equal to a slot number allocated for transmission by the second station, and (b) the periodic interval number from the most recently received moderator message equals the predetermined value.

5. The communication network as recited in claim 1 wherein said memory also stores a data mask; and said comparator logically combines the data mask, the periodic interval number and the predefined value to determine when to perform the defined operation.

6. A media access controller for a communication network in which activity on the communication network is divided into a succession of periodic intervals which are numbered consecutively according to a predetermined modulus, and in which each periodic interval has a fixed, predetermined duration and includes a set of time slots during which each one of a plurality of stations are sequentially afforded an opportunity to transmit, wherein each time slot is identified by an associated slot number, with the slot number being included in the transmission made during each time slot to thereby identify the current time slot, and during each periodic interval a network moderator station transmits a moderator message containing a periodic interval number in addition to the slot number, in which the periodic interval number represents a current value for the consecutive numbering of the periodic intervals, said media access controller comprising:

an interface for connecting to an external data processing device to exchange data therebetween;

a receiver connected to the communication network to receive messages therefrom;

a first register connected to said receiver for storing the periodic interval number obtained from each successively received moderator message;

a memory for storing an outgoing data packet received from the external processing device, and a specified count corresponding to a future periodic interval during which the outgoing data packet is to be transmitted;

a transmitter connected to said interface and to said memory for sending the data message over the communication network; and an access control circuit which is connected to said transmitter, the first register and the memory, and which enables said transmitter to send data over the communication network when the periodic interval number in the first register equals the specified count for transmitting the outgoing data message.

7. The media access controller as recited in claim 6 wherein said specified count is contained in a start-of-periodic-interval pseudo packet which is also received from the external processing device.

8. The media access controller as recited in claim 7 wherein said memory comprises a first in, first out memory.

9. The media access controller as recited in claim 6 further comprising a second register for storing a data mask; and wherein said access control circuit logically combines the data mask, the periodic interval number from the first register and the specified count for transmitting the outgoing data message from the memory to determine when to enable said transmitter.

10. A station for a digital communication network in which activity on the digital communication network is divided into a series of periodic intervals in which the periodic intervals are numbered consecutively according to a predetermined modulus, and in which each periodic interval has a fixed, predetermined duration and includes a set of time slots identified by an associated slot number, with the slot number being included in the transmission made during each time slot to thereby identify the current time slot, said station comprising:

- a modem connected to the digital communication network;
- a transmitter connected to said modem to send messages over the digital communication network;
- a first mechanism, coupled to said modem, for detecting a moderator message sent over the digital communication network by a moderator station during a fixed, predetermined point of each periodic interval, wherein the moderator message includes a periodic interval number in addition to the slot number, in which the periodic interval number represents a current value for the consecutive numbering of the periodic intervals; and
- a second mechanism responsive to said first mechanism for controlling said transmitter to delay transmission of an outgoing message by suppressing transmission during the time slot allotted to the station when the periodic interval number is less than a predefined value, and by enabling transmission during the next time slot allotted to the station after the periodic interval number has reached the predefined value.

\* \* \* \* \*